United States Patent
Inoue et al.

(10) Patent No.: US 9,034,501 B2
(45) Date of Patent: May 19, 2015

(54) ELECTRIC STORAGE UNIT

(75) Inventors: Tatehiko Inoue, Osaka (JP); Shusaku Kawasaki, Osaka (JP); Kimiyasu Kakiuchi, Osaka (JP); Rihito Shoji, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 548 days.

(21) Appl. No.: 12/522,271

(22) PCT Filed: Feb. 13, 2008

(86) PCT No.: PCT/JP2008/000210
§ 371 (c)(1),
(2), (4) Date: Jul. 7, 2009

(87) PCT Pub. No.: WO2008/099602
PCT Pub. Date: Aug. 21, 2008

(65) Prior Publication Data
US 2010/0015512 A1    Jan. 21, 2010

(30) Foreign Application Priority Data

Feb. 16, 2007 (JP) ................. 2007-036091
Apr. 19, 2007 (JP) ................. 2007-110231
Apr. 19, 2007 (JP) ................. 2007-110232
Apr. 19, 2007 (JP) ................. 2007-110233

(51) Int. Cl.
*H01M 10/613* (2014.01)
*B60L 11/18* (2006.01)
(Continued)

(52) U.S. Cl.
CPC ............. *H01M 10/5004* (2013.01); *B60K 6/28* (2013.01); *B60L 11/1874* (2013.01);
(Continued)

(58) Field of Classification Search
CPC ..... H01M 2/105; H01M 2/1077; H01M 6/44; H01M 2/1094; H01M 10/504; H01M 10/5004; H01M 10/5042; H01M 10/503
USPC .......................... 429/100, 151, 159, 163, 176
See application file for complete search history.

(56) References Cited

U.S. PATENT DOCUMENTS 5,091,823 A    2/1992 Kanbara et al.
5,489,484 A    2/1996 Wheeler et al.
(Continued)

FOREIGN PATENT DOCUMENTS

EP    1 450 422 A1    8/2004
JP    02-290099 A    11/1990
(Continued)

OTHER PUBLICATIONS

Supplementary European Search Report for Application No. EP 08 71 0364, Apr. 1, 2010, Panasonic Corporation.
(Continued)

*Primary Examiner* — Ula C Ruddock
*Assistant Examiner* — Thomas Parsons
(74) *Attorney, Agent, or Firm* — RatnerPrestia

(57) ABSTRACT

An electric power storage unit includes plural storage element blocks, an external bus bar for electrically connecting the storage element blocks, a base made of metal for fixing the storage element blocks, and a cover fixed to the base for accommodating the storage element blocks. Each of the storage element blocks includes plural electric power storage elements connected electrically to each other, and a case made of heat-conductive insulating resin for holding the electric power storage elements. This electric power storage unit reduces variation of cooling of the electric power storage elements, hence having high reliability.

9 Claims, 28 Drawing Sheets

(51) Int. Cl.
*H01G 2/04* (2006.01)
*H01G 2/08* (2006.01)
*H01G 9/08* (2006.01)
*H01G 9/00* (2006.01)
*H01M 2/10* (2006.01)
*H01M 2/20* (2006.01)
*H01M 10/42* (2006.01)
*H01M 10/48* (2006.01)
*H01M 10/617* (2014.01)
*H01M 10/625* (2014.01)
*H01M 10/643* (2014.01)
*H01M 10/6551* (2014.01)
*H01M 10/6555* (2014.01)
*H01M 10/6556* (2014.01)
*H01M 10/6563* (2014.01)
*H01G 11/10* (2013.01)
*H01G 11/82* (2013.01)
*B60K 6/28* (2007.10)
*H01M 10/653* (2014.01)
*H01M 10/6567* (2014.01)

(52) U.S. Cl.
CPC ............. *B60L 11/1879* (2013.01); *H01G 2/04* (2013.01); *H01G 2/08* (2013.01); *H01G 9/08* (2013.01); *H01G 9/155* (2013.01); *H01M 2/1077* (2013.01); *H01M 2/1094* (2013.01); *H01M 2/206* (2013.01); *H01M 10/425* (2013.01); *H01M 10/48* (2013.01); *H01M 10/5008* (2013.01); *H01M 10/5016* (2013.01); *H01M 10/503* (2013.01); *H01M 10/504* (2013.01); *H01M 10/5046* (2013.01); *H01M 10/5055* (2013.01); *H01M 10/5057* (2013.01); *H01M 10/5067* (2013.01); *H01M 10/5075* (2013.01); *Y02E 60/13* (2013.01); *Y02T 10/7005* (2013.01); *Y02T 10/7022* (2013.01); *Y02T 10/705* (2013.01); *H01G 11/10* (2013.01); *H01G 11/82* (2013.01)

(56) References Cited

U.S. PATENT DOCUMENTS

| | | | |
|---|---|---|---|
| 5,578,392 A * | 11/1996 | Kawamura | 429/99 |
| 6,174,618 B1 | 1/2001 | Nishiyama et al. | |
| 6,340,877 B1 | 1/2002 | Mita et al. | |
| 7,935,438 B2 * | 5/2011 | Kim | 429/160 |
| 2005/0064280 A1 | 3/2005 | Watanabe et al. | |
| 2006/0273758 A1 | 12/2006 | Sanada et al. | |
| 2007/0253146 A1 | 11/2007 | Inoue et al. | |

FOREIGN PATENT DOCUMENTS

| | | | |
|---|---|---|---|
| JP | 05-036392 A | 2/1993 | |
| JP | 05036392 A | 2/1993 | |
| JP | 08-508605 A | 9/1996 | |
| JP | 10-106902 A | 4/1998 | |
| JP | 10106902 A | 4/1998 | |
| JP | 11-016547 * | 1/1999 | |
| JP | 3777748 B | 4/1999 | |
| JP | 2001196265 A | 7/2001 | |
| JP | 2002-157982 A | 5/2002 | |
| JP | 2002157982 A | 5/2002 | |
| JP | 2005-149837 A | 6/2005 | |
| JP | 2005149837 A | 6/2005 | |
| JP | 3681051 B | 7/2011 | |
| WO | WO 03/038941 A1 | 5/2003 | |
| WO | WO 2006/134859 A1 | 12/2006 | |

OTHER PUBLICATIONS

Japanese Application Serial No. 2007110232, Office Action dated Dec. 6, 2011, 3 pgs.
Japanese Application Serial No. 2007036091, Office Action dated Dec. 6, 2011, 3 pgs.
Japanese Application Serial No. 2007110231, Office Action dated Dec. 6, 2011, 2 pgs.
Japanese Application Serial No. 2007110232, Office Action dated Dec. 31, 2011, 3 pgs.
Japanese Application Serial No. 2007036091, Office Action dated Dec. 31, 2011, 3 pgs.
Japanese Application Serial No. 2007110231, Office Action dated Dec. 31, 2011, 2 pgs.

* cited by examiner

ELECTRIC STORAGE UNIT

THIS APPLICATION IS A U.S. NATIONAL PHASE APPLICATION OF PCT INTERNATIONAL APPLICATION No. PCT/JP2008/000210.

TECHNICAL FIELD

The present invention relates to an electric power storage unit including an electric power storage element for storing electric power.

BACKGROUND ART

With an upsurge in recent years of the environmental concern and the pursuit of better fuel economy, hybrid electric vehicles have been put in the market. Such vehicles are driven not only by engines but also by electric motors, hence improving energy efficiencies and reduce their fuel costs. Those hybrid electric vehicles require an electric power storage unit capable of storing high power for driving the motors. The electric power storage unit has a function for not only driving the motors but also storing energy regenerated during braking. This function reduces the fuel costs by the effective use of braking energies.

The electric power storage unit repetitively charges and discharges electricity in a short period while the vehicle is driven. This operation produces heat due to an internal resistance of the electric power storage element, such as a secondary battery or a capacitor, for storing electric power. Upon remaining, the heat may have the electric power storage element deteriorate and shorten its life time, thus decreasing reliability.

An electric power storage unit cooling an electric power storage element is disclosed in Patent Document 1. FIG. 24 is an exploded perspective view of the electric power storage unit.

In FIG. 24, electric cell 501 composed of a secondary battery is used as the electric power storage element for storing electric power. Plural electric cells 501 (six cells shown in FIG. 24) are connected to form battery module 503. A number of battery modules 503 are stacked in multiple rows and multiple stages to provide a battery module unit 505 to provide predetermined power. Battery module unit 505 is fixed to case body 507. Battery modules 503 are electrically connected to one another with bus bars 511 and screws 513 fixed to screw holes in terminals 509 provided on respective ends of battery modules 503. In addition, case body 507 is provided with fan 515 for cooling battery module unit 505. Cover 517 is fixed to case body 507, thus providing the electric power storage unit.

The above electric power storage unit includes fan 515 operating while the vehicle is used for cooling battery module unit 505, hence having reliability.

The above electric power storage unit is indeed capable of cooling battery module unit 505 and has high reliability by operating fan 515 when the vehicle is used. However, even when fan 515 delivers air to battery module unit 505, the air does not necessarily cools each electric cell 501 as well. In other words, while electric cells 501 near fan 515 are indeed cooled effectively, the cooling air is not delivered sufficiently to electric cells 501 located far from fan 515. Electric cells 501 located far from fan 515 receives air warmed by electric cells 501 near to fan 515, hence reducing cooling efficiency. As a result, variations in the degrading of the cells, i.e., in their life time since effects of the cooling are different among electric cells 501. In view of the variations of degradation of the individual electric cells 501, the above-discussed structure is therefore not sufficient to ensure the reliability although it has achieved a certain degree of improvement in the reliability compared with the conventional structures not having the cooling function.

Patent Document 1: Japanese Patent No. 3681051

SUMMARY OF THE INVENTION

An electric power storage unit includes plural storage element blocks, an external bus bar for electrically connecting the storage element blocks, a base made of metal for fixing the storage element blocks, and a cover fixed to the base for accommodating the storage element blocks. Each of the storage element blocks includes plural electric power storage elements connected electrically to each other, and a case made of heat-conductive insulating resin for holding the electric power storage elements.

This electric power storage unit reduces variation of cooling of the electric power storage elements, hence having high reliability.

REFERENCE NUMERALS

111 Electric Power Storage Element
113 Case
115 Storage Element Block
133 Base
134 Heat-Conductive Paste
141 Fin
143 Cover
149 Sealing Element
155 Heat-Conductive Resin
157 Heat-Conductive Elastic Material
161 Cooling Water Passage
211 Electric Power Storage Element
233 Base
213 Holder
234 Heat-Conductive Insulating Grease
252 Bottom Portion
255 Through-Hole
256 Step Portion
311 Electric Power Storage Element
321 Bus Bar
329 Bottom Portion
331 Lower Case
333 Retaining Hole
335 Elastic Portion
336 Through-Hole
343 Upper Case
345 Top Portion
347 Contact Portion
371 Base
373 Heat-Conductive Insulating Grease
374 Step Portion
411 Electric Power Storage Element
421 Bus Bar
429 Bottom Portion
431 Lower Case
433 Retaining Hole
435 Elastic Portion
436 Through-Hole
443 Upper Case
445 Top Portion
435a Center Portion
435b Beam
447 Contact Portion
471 Base
473 Heat-Conductive Insulating Grease
474 Step Portion

DETAILED DESCRIPTION OF PREFERRED EMBODIMENTS

Exemplary Embodiment 1

Figure 1:
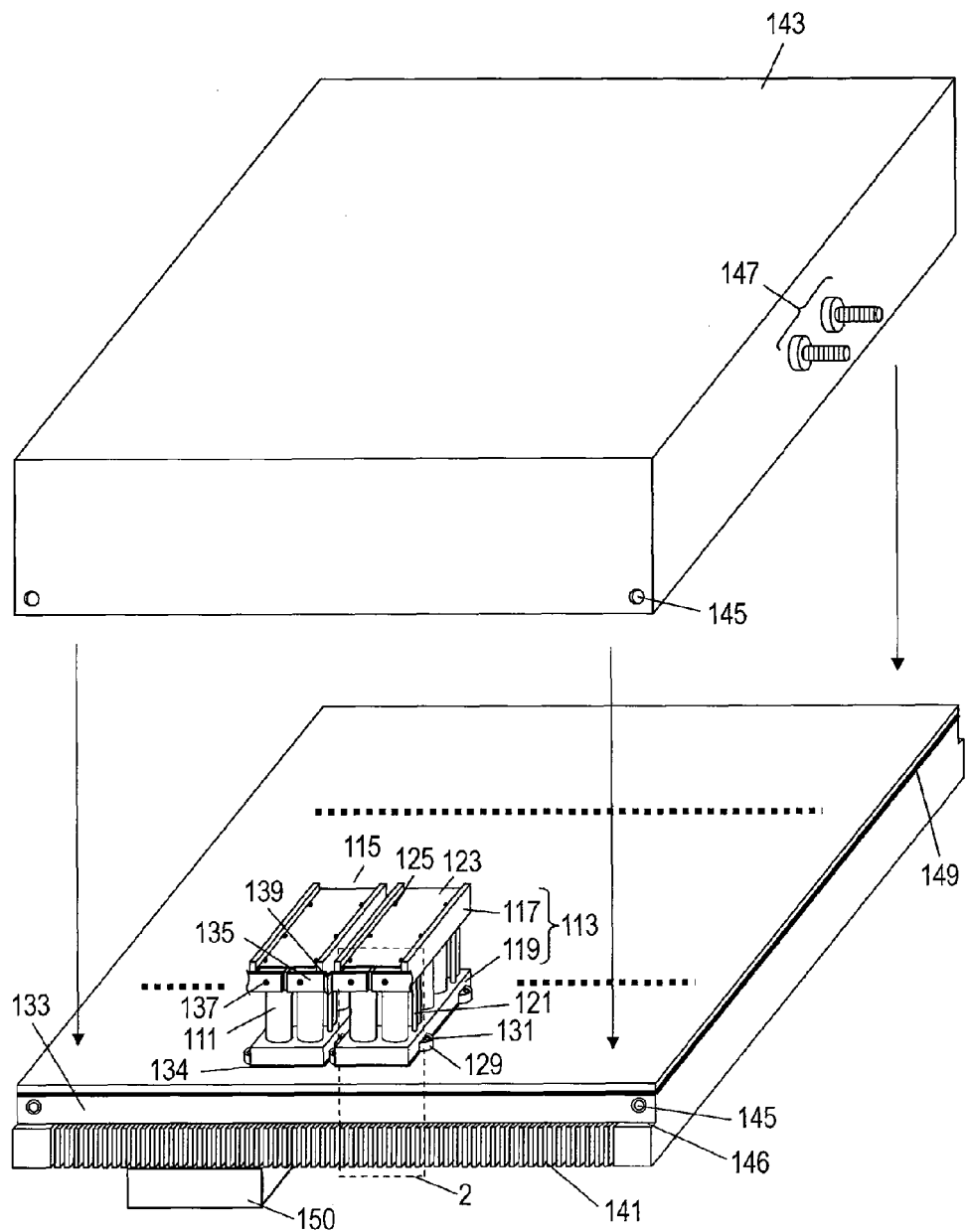
FIG. 1 is an exploded perspective view of an electric power storage unit according to Exemplary Embodiment 1 of the present invention.
Figure 2:
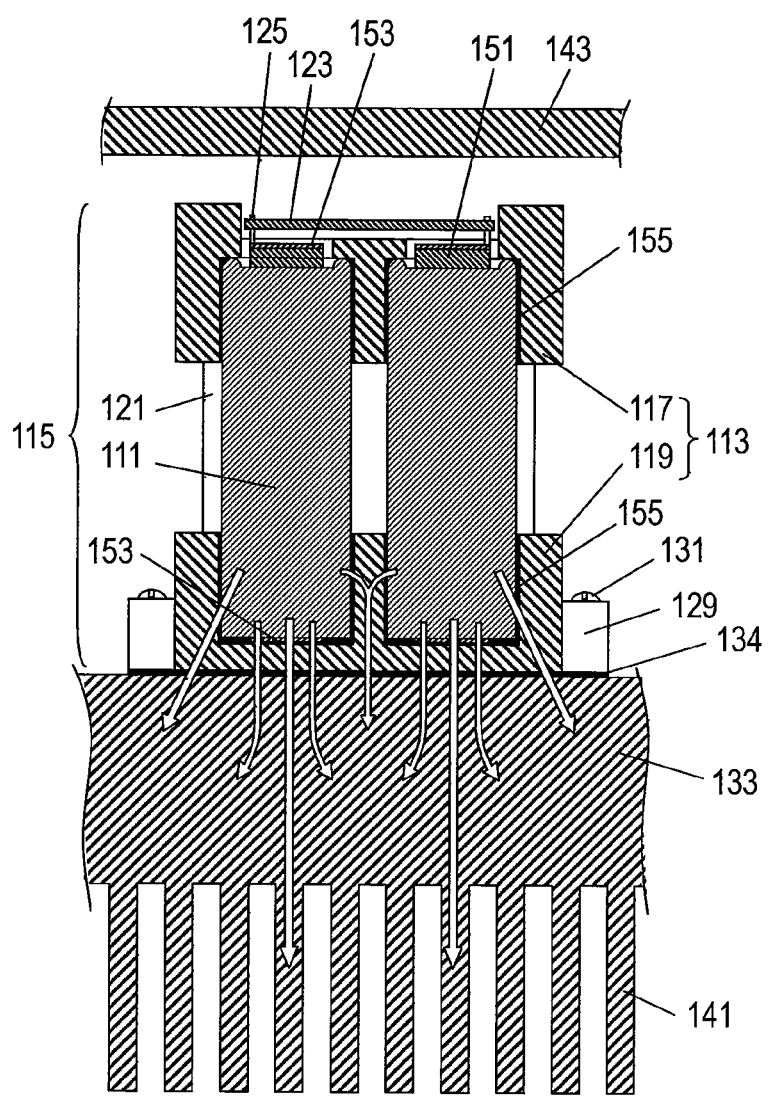
FIG. 2 is a cross sectional view of the electric power storage unit according to Embodiment 1.

FIG. 1 is an exploded perspective view of an electric power storage unit according to Exemplary Embodiment 1 of the present invention. FIG. 2 is a cross sectional view of the electric power storage unit according to Embodiment 1.

As shown in FIG. 1, electric power storage element 111 is an electric double layer capacitor having a large capacitance operable to be charged and discharged quickly. However, the electric double layer capacitor has a low rated voltage of about 2.2V, and causes plural electric power storage elements 111 to be connected electrically in order to obtain a high rated voltage necessary for, e.g. driving a motor of a vehicle. In this case, plural storage element blocks 115 each including a predetermined number of electric power storage elements 111, e.g. ten elements according to Embodiment 1, and case 113 mechanically holding the elements.

Case 113 includes upper case 117 and lower case 119, and have respective both ends of ten electric power storage elements 111 inserted therein so as to hold elements 111. Upper case 117 and lower case 119 are mechanically connected with plural fixing rods 121 and fixing screws. Both upper case 117 and lower case 119 are made of heat-conductive insulating resin and formed by injection molding. The heat-conductive insulating resin may be polyphenylene sulfide containing filler made of ceramic. All the materials are insulating materials to ensure a high insulating property while the ceramic filler improves the heat-conductivity. These materials have high resistant to heat, hence providing high reliability to temperatures.

A resin, such as silicone-base resin, having a high heat-conductivity, fills a gap provided between each of electric power storage element 111 and each portion of case 113 holding electric power storage elements 111. More specifically, the resin is injected into the portions of case 113 holding the electric power storage elements, and then, the elements are inserted. Then the resin is cured to locate the resin in the gap. The resin allows heat to transfer from electric power storage elements 111 to case 113 efficiently.

Circuit board 123 carrying a circuit, such as a voltage detector circuit or a voltage balancer circuit, is provided on an upper surface of upper case 117. Circuit board 123 is connected electrically and mechanically by soldering to terminals 125 provided on bus bars interconnecting respective electrodes of electric power storage elements 111.

Lower case 119 has four mounting portions 129 formed unitary locations on side surfaces of the lower case. Mounting portions 129 have screw holes, respectively. Storage element block 115 is fixed to base 133 with screws 131 tightened through these holes. Heat-conductive paste 134 is provided between respective contact surfaces of lower case 119 and base 133. That is, lower case fixing screws 131 are tightened with heat-conductive paste 134 applied on the entire bottom surface of lower case 119. This allows heat on lower case 119 to transmit to base 133 efficiently. Heat-conductive paste 134 can be replaced by a heat-conductive elastic material made of elastic material, such as rubber, containing heat conductive material, such as metal or carbon, or by a heat-conductive sheet made of heat-conductive resin.

After all of a predetermined number of storage element blocks 115 are fixed to base 133, external bus bars 135 are fastened with bus bar screws 137 to connect electrically between storage element blocks 115 adjacent to each another while FIG. 1 shows only two storage element blocks 115. Thus, all of electric power storage elements 111 are connected electrically with each other. External bus bars 135 have large currents to flow therein. Bus bars 135 are made of copper having a small specific resistance and have a thickness of about 1 mm so as to reduce their internal resistances and reducing heat generated from the bus bars. Each of external bus bars 135 has flexible portion 139 absorbing stresses applied to external bus bar 135 due to thermal expansions and vibrations, thus providing high reliability.

Base 133 is made of aluminum having light weight and high heat-conductivity. Base 133 has all electric power storage elements 115 mounted thereon, and has a large surface area and a large thermal capacity accordingly. This structure facilitates uniformly transmitting heat of all storage element blocks 115 to base 133, and uniformly cools electric power storage elements 111. This equalizes the degradation of electric power storage elements 111 due to the heat, thereby providing the electric power storage unit with high reliability.

Base 133 has plural fins 141 provided on a surface of base 133 opposite to the surface having storage element blocks 115 fixed thereon. According to Embodiment 1, fins 141 are formed unitary with base 133. At least some of fins 141 are located on portions of the surface of base 133 opposite to portions of the surface of base 133 facing bottom surfaces of plural storage element blocks 115. Fins 141 are located directly under the storage element blocks 115, and efficiently radiate heat transmitting to base 133. Fan 150 can be provided a location, such as bottom surfaces of fins 141, which cooling air to fins 141 effectively reach. This structure effectively dissipates heat from fins 141 to cool storage element blocks 115 quickly.

Cover 143 made of resin is placed over base 133 so as to enclose al storage element blocks 115 entirely. Cover 143 is secured to base 133 with cover screws through screw holes 145 provided in cover 143 and base 133. Fins 141 are longer than base 133 in their depth direction, as shown in FIG. 1, hence providing step portion 146 at the boundary between base 133 and each fin 141. A bottom edge of cover 143 contacts step portion 146, and prevents cover 143 from blocking fins 141. As a result, cover 143 does not reduce cooling effects of fins 141.

Power terminals 147 are provided on cover 143 for exchanging power between the electric power storage unit and an external device. Power terminals 147 are connected to storage element blocks 115 via power cables.

Cover 143 placed on base 133 prevents air outside of the electric power storage unit from directly reaching electric power storage elements 111, hence reducing uneven dissipation of heat. Cover 143 prevents particulates in exhaust gas and dust in the outside from being attached onto storage element blocks 115 to reduce the risk of a problem, such as short-circuiting, hence providing high reliability.

As shown in FIG. 1, sealing element 149, such as an O-ring, is provided around a fitting portion (i.e., side surfaces of base 133 above screw holes 145) when cover 143 is placed on base 133. Sealing element 149 prevents air from entering from the outside of the electric power storage unit through a gap between cover 143 and base 133. This structure prevents the unit from being cooled unevenly due to the air. A space enclosed by base 133 and cover 143 is sealed and filled with dry air. The dry air prevents dew condensation inside the electric power storage unit even when the ambient temperature decreases, thus providing high reliability. The dry air has a dew point of −40° C. This temperature is the lowest temperature for storing the electric power storage unit. Dew condensation does not occur at temperatures not lower than the lowest storage temperature. Even if the temperature decreases below the lowest storage temperature, dew condensation does not occur since air having the dew point of −40° C. contains extremely small amount of water vapor.

FIG. 2 is a cross sectional view of the electric power storage unit in plane 2 shown in FIG. 1. FIG. 2 also shows a cross section of cover 143.

A structure that is not shown in FIG. 1 will be described below. Electric power storage elements 111 have a circular-column, cylindrical shape having a diameter of 30 mm, for instance, and have electrodes 151 at both end surfaces thereof. The electrode on the bottom end surface of each electric power storage element 111 shown in FIG. 2 is unitarily constructed with the cylindrical shape of electric power storage element 111. Bus bar 153 is welded to the electrode on the bottom end surface of each electric power storage elements 111 adjacent to each other so as to electrically connect between the electrodes.

Electrode 151 protrudes from the top end surface of each of electric power storage elements 111. Bus bar 153 is welded to the electrode of each element to electrically connect between electric power storage elements 111 adjacent to each other. Bus bar 153 provided on the top end surfaces of electric power storage elements 111 has terminal 125 unitarily with bus bar 153 to be electrically connected to circuit board 123.

Heat-conductive resin 155 is provided in the gap between each electric power storage element 111 and the portion holding the electric power storage element, as discussed above.

Heat dissipation of electric power storage element 111 will be described with reference to the cross-sectional view of FIG. 2. When electric power storage elements 111 is heated up due to repetitive of charging and discharging of the electric power storage unit, the heat transmits to base 133 through lower case 119 and heat-conductive paste 134, as shown by the thick arrows in FIG. 2. The heat of electric power storage elements 111 can transmit efficiently to base 133 in this process since lower case 119 is made of the heat-conductive insulating resin. The thinner lower case 119 under the bottom end surfaces of electric power storage elements 111 is, the faster the heat transmits. Upon being excessively thin, the lower case may short-circuit between the electrode on the bottom end surface of electric power storage element 111 and base 133 made of aluminum due to a voltage of the electrode reaching several hundred volts. Lower case 119 has a thickness of several millimeters at portions around the bottom end surfaces of electric power storage elements 111 so as to increase its insulating property.

The heat transmitting to base 133 flows in lateral directions as well as downward direction shown in FIG. 2, and reaches fins 141. The large surface area of fins 141 dissipates the heat efficiently.

The structure described above prevents air from reaching electric power storage elements 111 from outside of the unit, and thermally couples bottom portions of electric power storage elements with each other. This structure dissipates the heat evenly, and reduces a variation of cooling effects, thus providing the electric power storage unit with high reliability.

Exemplary Embodiment 2

Figure 3:
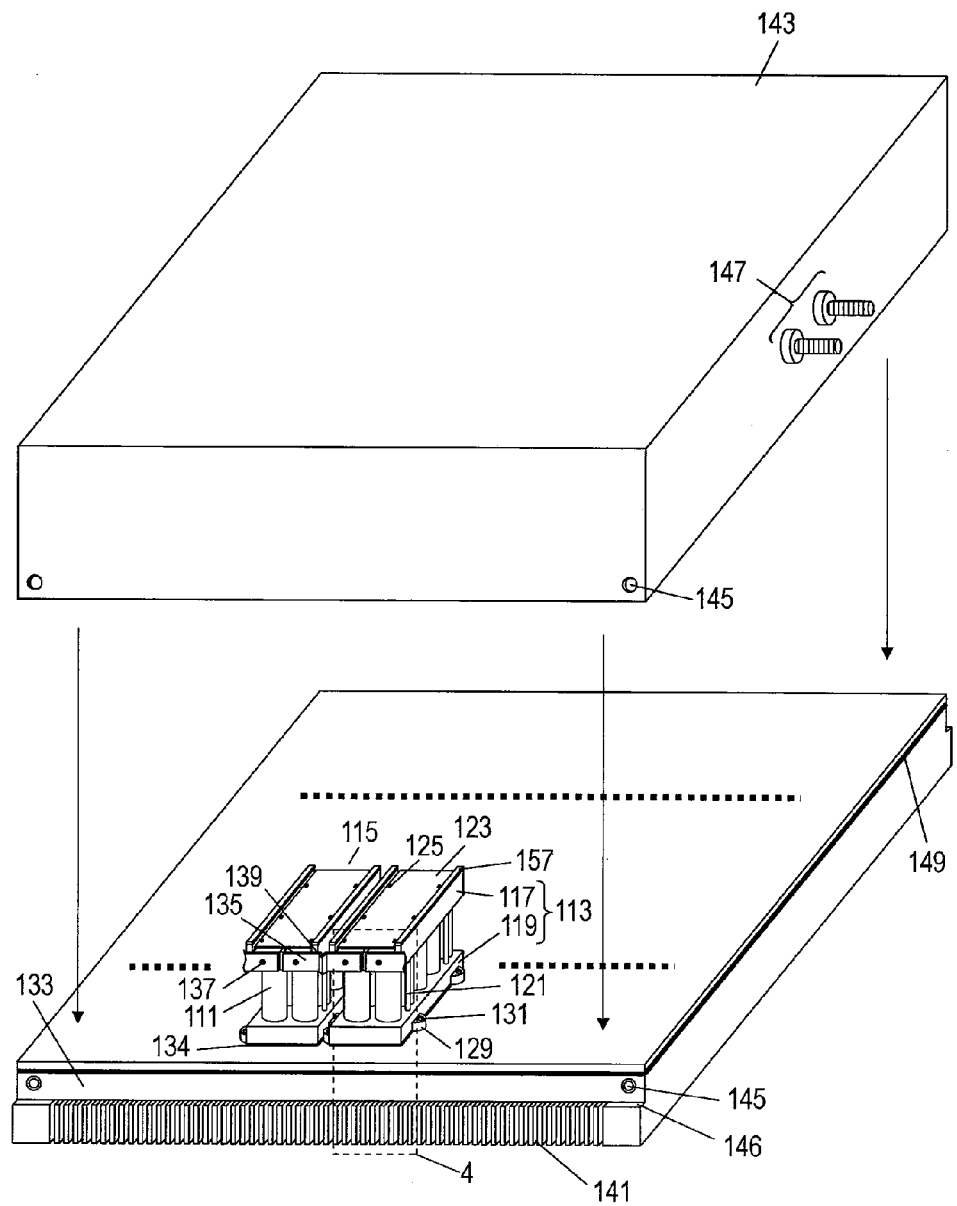
FIG. 3 is an exploded perspective view of the electric power storage unit according to Exemplary Embodiment 2 of the invention.
Figure 4:
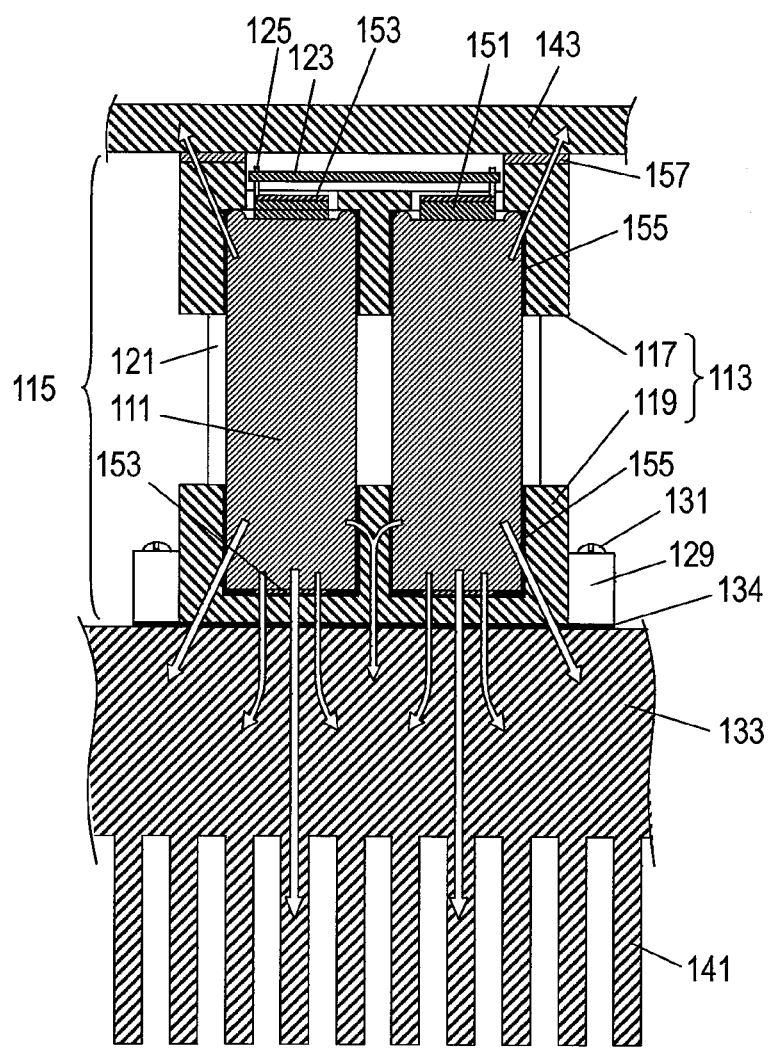
FIG. 4 is a cross sectional view of the electric power storage unit according to Embodiment 2.

FIG. 3 is an exploded perspective view of an electric power storage unit according to Exemplary Embodiment 2 of the present invention. FIG. 4 is a cross sectional view of the electric power storage unit according to Embodiment 2. In FIG. 3, components identical to those shown in FIG. 1 are denoted by the same reference numerals, and their detail description will be omitted.

The unit according to Embodiment 2 has the following features:

(1) Heat-conductive elastic materials 157 made of elastic material, such as rubber, containing heat-conductive material, such as metal or carbon, are provided on portions of an upper surface of upper case 117 at both sides of upper case 117 in a longitudinal direction of circuit board 123; and (2) At least a part of the top surface of upper case 117 contacts cover 143 via heat-conductive elastic material 157 when cover 143 is placed on base 133. In other words, cover 143 and the top surface of upper case 117 faces each other across heat-conductive elastic material 157, and contacts heat-conductive elastic material 157.

The structure will be described in detail. Upper surfaces of heat-conductive elastic materials 157 are located above the tallest component mounted onto circuit board 123. This structure causes heat-conductive elastic materials 157 to contact cover 143 when cover 143 is placed, thereby not applying a stress produced due to the contact between cover 143 and components onto the components and the circuit board. Storage element blocks 115 are secured to cover 143 with heat-conductive elastic materials 157. This structure holds storage element blocks 115 securely against vibration in vertical directions in FIG. 3, and allows heat-conductive elastic materials 157 to absorb vibrations in the vertical to reduce influence of the vibrations to electric power storage elements 111. In the structure shown in FIG. 3, heat-conductive elastic materials 157 are located along the both sides of upper case 117 in the longitudinal direction of circuit board 123. Heat-conductive elastic materials 157 can be provided on the entire upper surface of the upper case 117 unless circuit board 123 is located on the upper surface.

Cover 143 is made of heat-conductive insulating resin and formed by injection molding similarly to case 113. This resin allows cover 143 to dissipate heat from upper case 117. Cover 143 can be made of aluminum, material of base 133, if a voltage of the electric power storage unit is not so high as to reduce a risk of short-circuiting. In this case, a stress exerted on cover 143 due to thermal expansion can be avoided since aluminum is superior in heat dissipation and it is the same metal as base 133.

FIG. 4 is a cross sectional view of the electric power storage unit in plane 4 shown in FIG. 3. FIG. 4 also illustrates cover 143.

In FIG. 4, the heat of electric power storage elements 111 is dissipated from bottom portions of the elements to base 133 via lower case 119, similarly the unit according to Embodiment 1. According to Embodiment 2, the heat is dissipated from cover 143 also via upper case 117, which will be described below.

The heat on the top portions of electric power storage elements 111 transmits from upper case 117 to cover 143 via heat-conductive elastic materials 157 in slanting, upward directions shown by thick-line arrows in FIG. 4. Since upper case 117 and cover 143 are made of the same material, the heat transmits enough well to cover 143 efficiently.

In the structure according to Embodiment 2, the heat can be dissipated not only from the lower portions of electric power storage elements 111, but also from the upper portions of elements 111, thereby being dissipated quickly. This structure thermally couples electric power storage elements 111 entirely so as to reduce the cooling unevenness.

This structure thermally couples electric power storage elements 111 entirely so as to reduce the cooling unevenness, hence providing the electric power storage unit with high reliability.

According to Embodiment 2, heat-conductive elastic materials 157 are provided between upper case 117 and cover 143. Instead, the upper surface of upper case 117 at both sides along the longitudinal direction of circuit board 123 is located above the tallest component mounted onto circuit board 123 so as to prevent upper case 117 from contacting cover 143. This structure can keep cover 143 away from components and avoids a stress applied to the components and circuit board 123, thus providing high reliability. This structure does not require heat-conductive elastic materials 157, thus being simple. It can be determined whether heat-conductive elastic materials 157 absorbing the influence of vibrations according to the conditions of vibration on the electric power storage unit. The entire upper surface of upper case 117 may contact cover 143 unless circuit board 123 is provided on the upper surface.

Exemplary Embodiment 3

Figure 5:
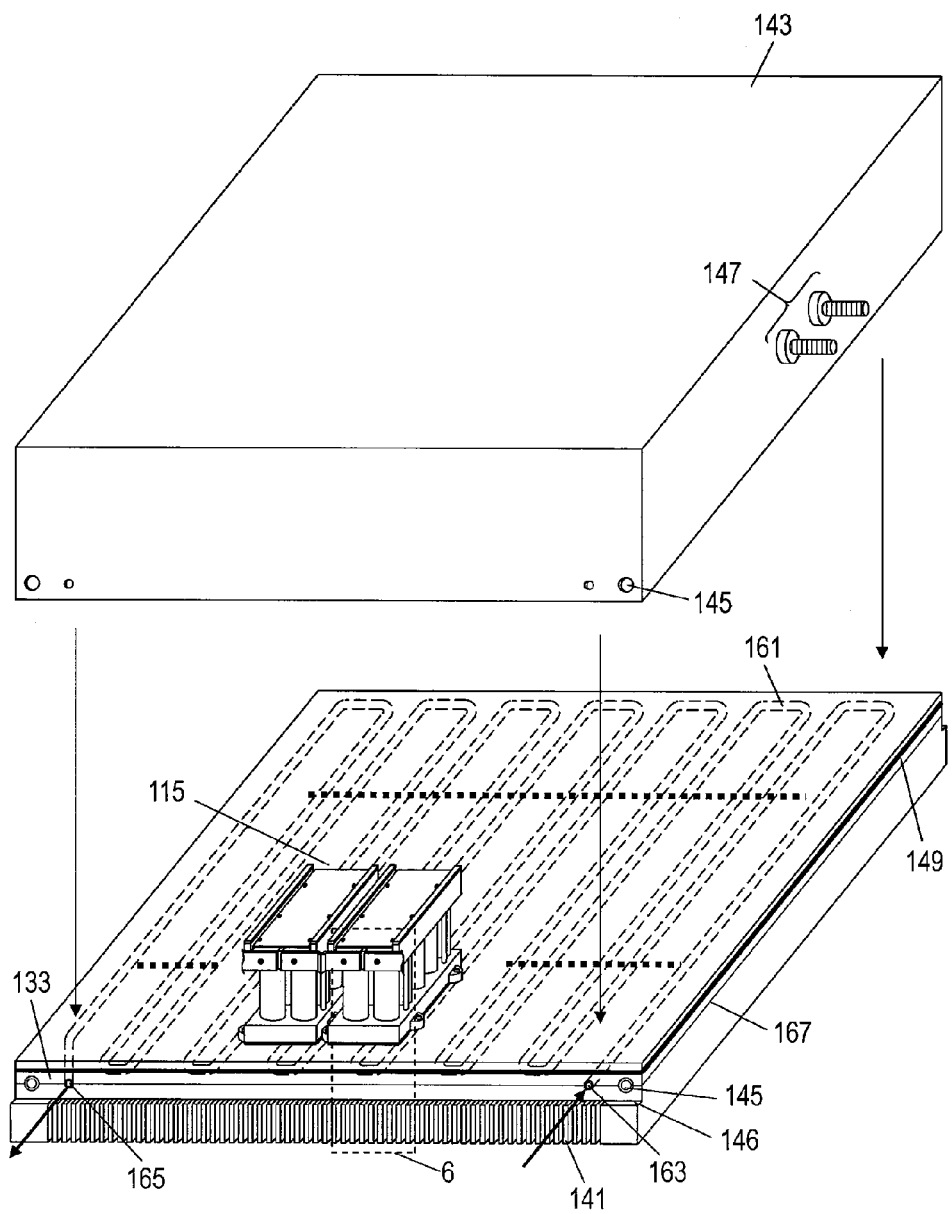
FIG. 5 is an exploded perspective view of an electric power storage unit according to Exemplary Embodiment 3 of the invention.
Figure 6:
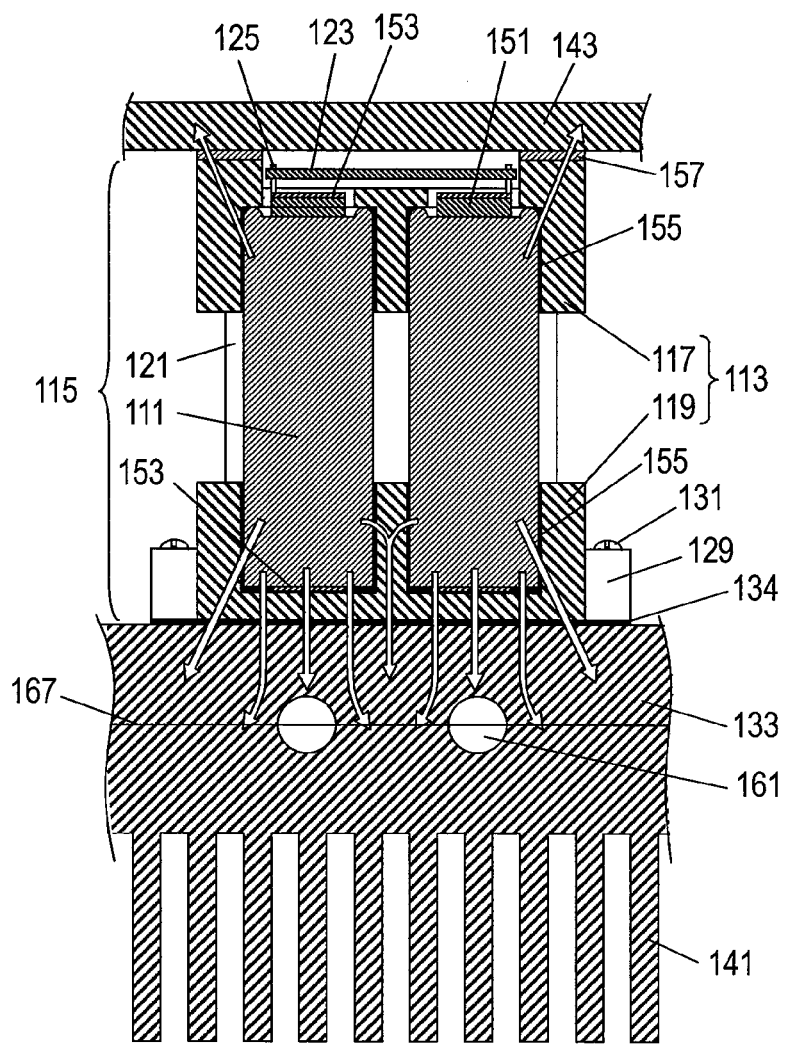
FIG. 6 is a cross sectional view of the electric power storage unit according to Embodiment 3.

FIG. 5 is an exploded perspective view of an electric power storage unit according to Exemplary Embodiment 3 of the present invention. FIG. 6 is a cross sectional view of the electric power storage unit according to Embodiment 3. In FIG. 5, components identical to those shown in FIG. 3 are denoted by the same reference numerals, and their detail description will be omitted. Storage element block 115 has the same structure as that of Embodiment 2, and the reference numerals denoting the detail structure of block 115 will be omitted.

According to Embodiment 3, cooling-water passage 161 is formed inside base 133. Cooling water containing antifreeze solution circulates in cooling-water passage 161 to increase cooling efficiency. Cooling-water passage 161 is provided in base 133 and faces bottom surfaces of storage element blocks 115. In other words, cooling-water passage 161 is located directly under the bottom surfaces of individual storage element blocks 115. Cooling-water passage 161 can be located directly under the bottom surfaces of the storage element blocks 115, and, according to Embodiment 3, cooling-water passage 161 is directly under a bottom surface of each electric power storage element 111 to improve the cooling efficiency. That is, since each of the storage element blocks 115 has two rows of electric power storage elements 111, two cooling-water passages 161 are arranged directly under the bottom surface of each storage element block 115.

Cooling-water passage 161 is arranged in a meander pattern from cooling-water inlet port 163 to cooling-water outlet port 165, as shown in FIG. 5. Base 133 includes upper and lower parts bonded at interface 167 in order to form cooling-water passage 161 in base 133. Cooling-water passage 161 having a semicircular cross section is formed in each of the upper and lower parts of base 133, and the parts are put together and fixed with screws to form cooling-water passage 161.

FIG. 6 is a cross sectional view of the electric power storage unit in plane 6 shown in FIG. 5. FIG. 6 also illustrates cover 143 similarly to FIG. 2. As shown in FIG. 6, cooling-water passage 161 is located directly under the bottom surfaces of the electric power storage elements 111. The distance from each electric power storage element 111 to cooling-water passage 161 is shorter than that from each electric power storage element 111 to fins 141. This arrangement allows the cooling water to absorb heat of electric power storage elements 111 efficiently, as shown by thick-line arrows in FIG. 6, to cool it quickly while reducing unevenness of the cooling.

Cooling-water passage 161 may sufficiently reduce cooling unevenness depending on power of the electric power storage unit. In this case, the unit does not necessarily include fins 141.

Cooling-water passage 161 may be made of a cooling-water tube attached to the bottom surface of base 133 by, e.g. welding, instead of the two separate parts to form cooling-water passage 161 in base 133. This structure is simple, but decreases the number of fins 141 since fins 141 are located to avoid the cooling-water tube. The position of the cooling-water tube, whether fins 141 be provided, and the number of the fins are determined according to the amount of the heat.

The cooling water efficiently absorbs the heat of thermally coupled electric power storage elements 111 to reduce cooling unevenness and to cool it quickly, thus providing the electric power storage unit with high reliability.

According to Embodiments 1 to 3, electric power storage element 111 is an electric double layer capacitor, and can be an electrochemical capacitor or a secondary battery having problems to heat.

The electric power storage units according to Embodiments 1 to 3 is applicable not only to a power supply for a hybrid electric vehicle, but also to an auxiliary power supply for any vehicle equipped with a system, such as an idling-stop mechanism, an electric power steering, or an electric supercharger, that requires charging and discharging of electric power storage elements 111 repetitively in a short period of time. The electric power storage unit is applicable to an emergency power supply besides motor vehicles.

Exemplary Embodiment 4

An electric power storage unit according to Exemplary Embodiment 4 of the present invention will be described with referring to the accompanying drawings. In the electric power storage unit according to Embodiment 4, a lower holder has through-holes therein at areas where bottom portions of electric power storage elements faces a base. The through-holes are filled with heat-conductive insulating grease.

Figure 7:
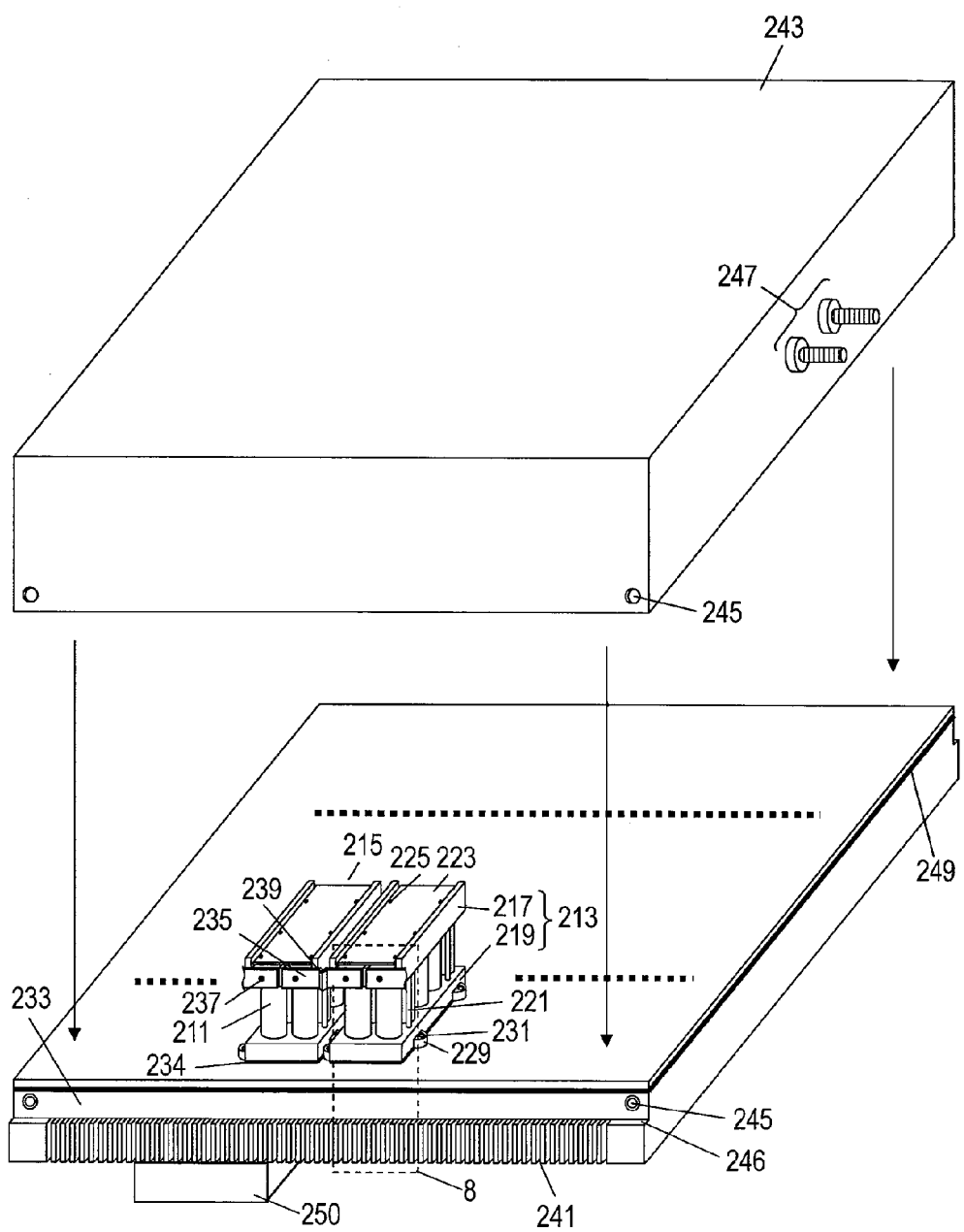
FIG. 7 is an exploded perspective view of an electric power storage unit according to Exemplary Embodiment 4 of the invention.
Figure 8:
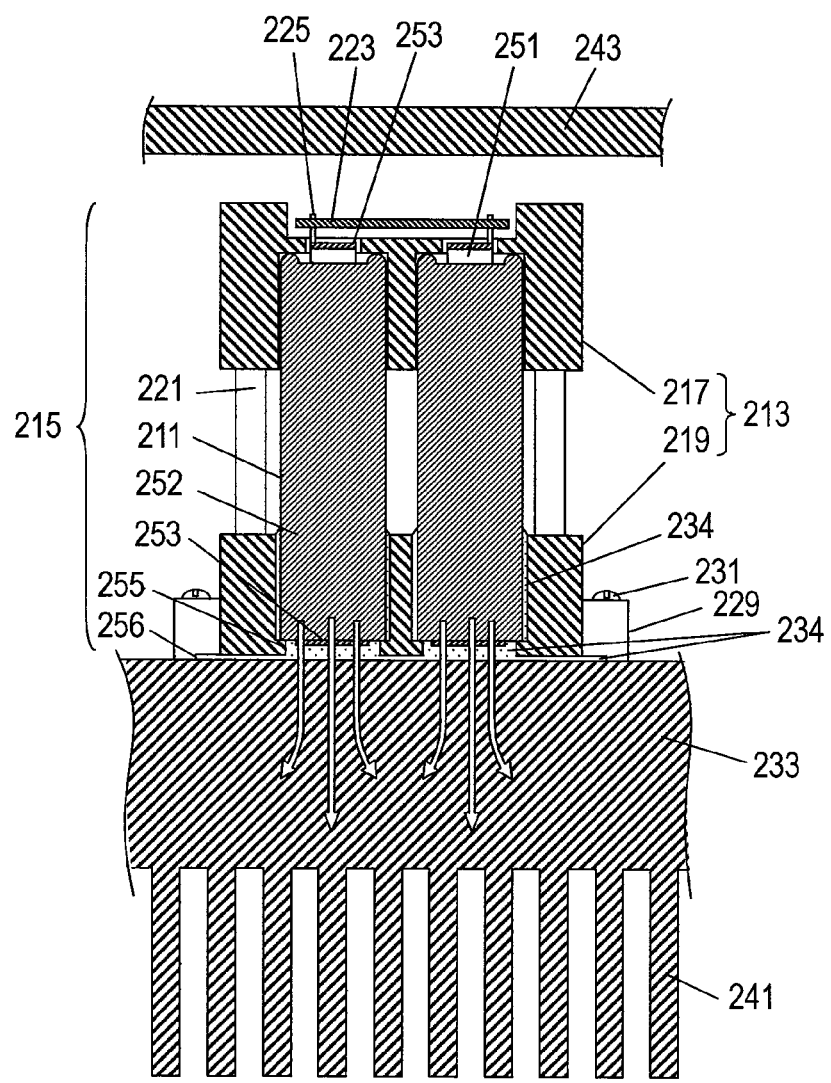
FIG. 8 is a cross sectional view of the electric power storage unit according to Embodiment 4.
Figure 9A:
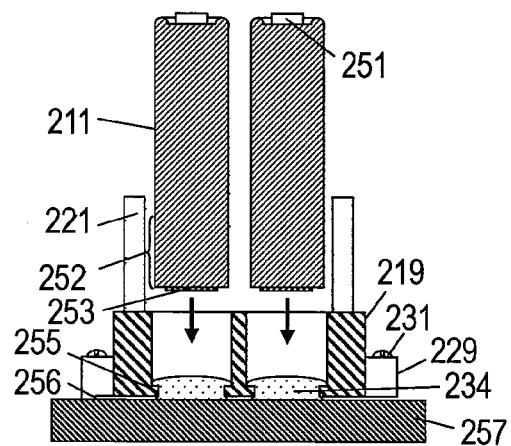
FIG. 9A is a cross sectional view of the electric power storage unit for illustrating a method of manufacturing the electric power storage unit according to Embodiment 4.
Figure 9B:
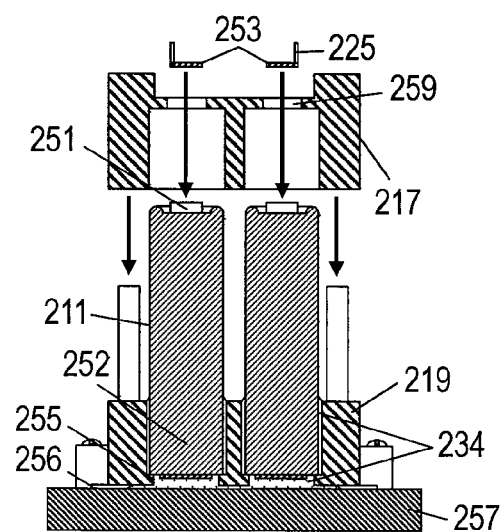
FIG. 9B is a cross sectional view of the electric power storage unit for illustrating the method of manufacturing the electric power storage unit according to Embodiment 4.
Figure 9C:
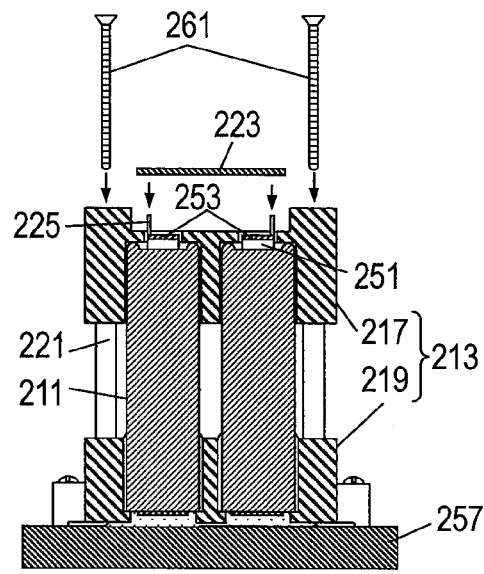
FIG. 9C is a cross sectional view of the electric power storage unit for illustrating the method of manufacturing the electric power storage unit according to Embodiment 4.
Figure 9D:
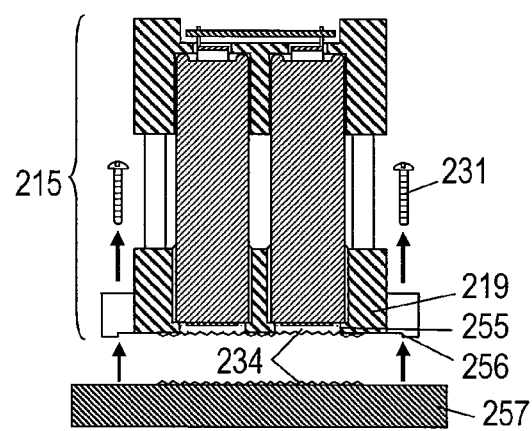
FIG. 9D is a cross sectional view of the electric power storage unit for illustrating the method of manufacturing the electric power storage unit according to Embodiment 4.
Figure 9E:
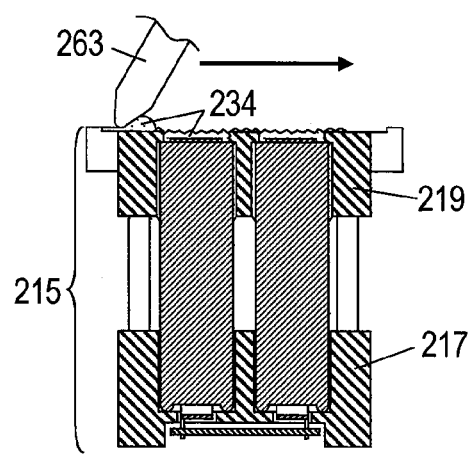
FIG. 9E is a cross sectional view of the electric power storage unit for illustrating the method of manufacturing the electric power storage unit according to Embodiment 4.
Figure 9F:
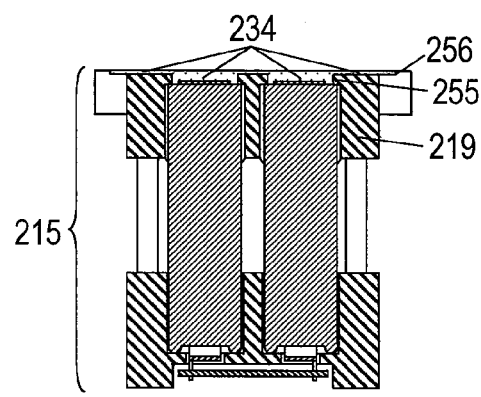
FIG. 9F is a cross sectional view of the electric power storage unit for illustrating the method of manufacturing the electric power storage unit according to Embodiment 4.
Figure 10:
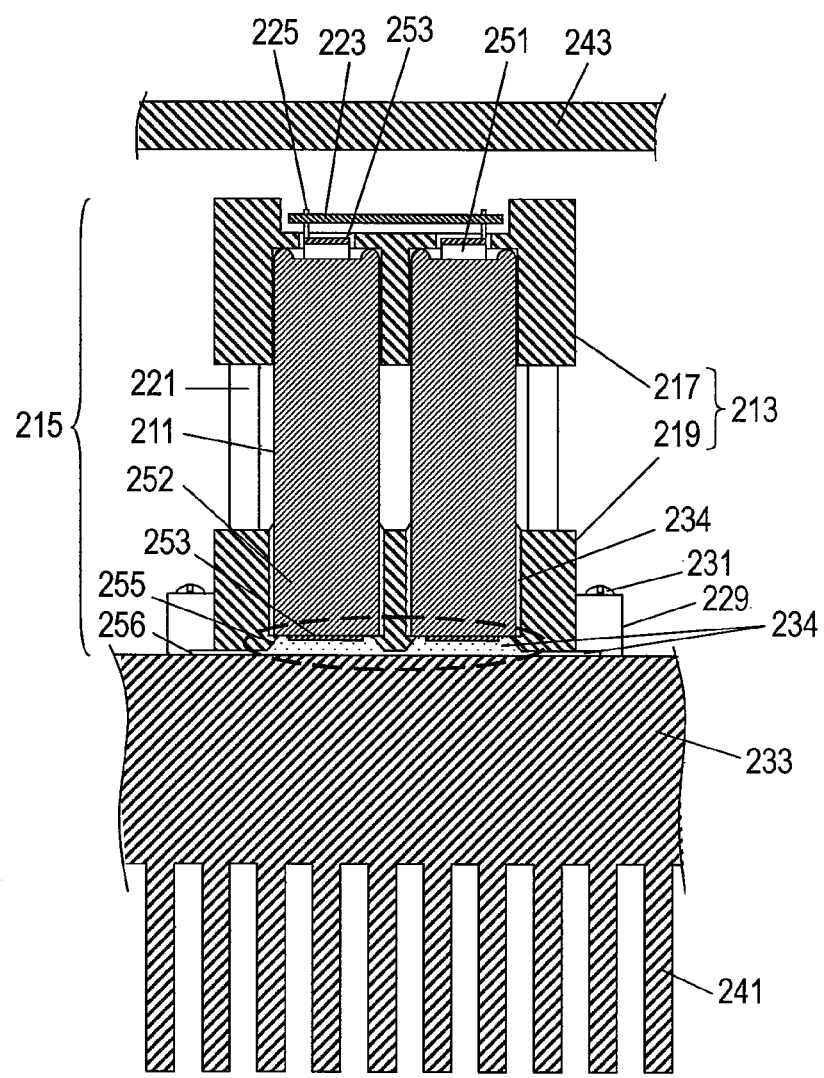
FIG. 10 is a cross sectional view of another electric power storage unit according to Embodiment 4.

FIG. 7 is an exploded perspective view of the electric power storage unit according to Embodiment 4. FIG. 8 is a cross sectional view of the electric power storage unit according to Embodiment 4. FIGS. 9A to 9F are cross sectional views of the electric power storage unit according to Embodiment 4 for illustrating a method of manufacturing the unit. FIG. 9A is a cross sectional view of the electric power storage unit including electric power storage elements inserted in the lower holder. FIG. 9B is a cross sectional view of the unit including an upper holder and bus bars mounted to the electric power storage elements. FIG. 9C is a cross sectional view of the unit including the upper holder mounted to fixing rods and including a circuit board mounted to terminals. FIG. 9D is a cross sectional view of the unit including a storage element block removed from an assembling table. FIG. 9E is a cross sectional view of the unit including the heat-conductive insulating grease applied onto a bottom surface of the lower holder. FIG. 9F is a cross sectional view of the unit after the heat-conductive insulating grease is applied to the bottom surface of the lower holder. FIG. 10 is a cross sectional view of another electric power storage unit according to Embodiment 4.

Electric power storage element 211 shown in FIG. 7 is an electric double layer capacitor having a large capacitance and capable of being charged and discharged quickly. However, the electric double layer capacitor has a low rated voltage of about 2.2V, and causes plural electric power storage elements 211 to be connected electrically in order to obtain a high rated voltage necessary for, e.g. driving a motor of a vehicle. In this case, plural storage element blocks 215 each including a predetermined number of electric power storage elements 111, e.g. ten elements according to Embodiment 4, and holder 213 mechanically holding the elements.

Holder 213 includes upper holder 217 and lower holder 219, and have respective both ends of ten electric power storage elements 211 inserted therein so as to hold elements 211. Upper holder 217 and lower holder 219 are mechanically connected with plural fixing rods 221 and fixing screws. Both upper holder 217 and lower holder 219 are made of heat-conductive insulating resin and formed by injection molding.

Circuit board 223 carrying a circuit, such as a voltage detector circuit or a voltage balancer circuit, is provided on an upper surface of upper case 217. Circuit board 223 is connected electrically and mechanically by soldering to terminals 225 provided on bus bars interconnecting respective electrodes of electric power storage elements 211.

Lower holder 219 has four mounting portions 229 formed unitary locations on side surfaces of the lower holder. Mounting portions 229 have screw holes, respectively. Storage element block 215 is fixed to base 233 with screws 231 tightened through these holes. Heat-conductive paste 234 is provided between respective contact surfaces of lower holder 219 and base 233. Heat-conductive insulating grease 234 will be described in detail later.

After all of a predetermined number of storage element blocks 215 are fixed to base 233, external bus bars 235 are fastened with bus bar screws 237 to connect electrically between storage element blocks 215 adjacent to each another while FIG. 7 shows only two storage element blocks 215. Thus, all of electric power storage elements 211 are connected electrically with each other. External bus bars 235 have large currents to flow therein. Bus bars 235 are made of copper having a small specific resistance and have a thickness of about 1 mm so as to reduce their internal resistances and reducing heat generated from the bus bars. Each of external bus bars 235 has flexible portion 239 absorbing stresses applied to external bus bar 235 due to thermal expansions and vibrations, thus providing high reliability.

Base 233 is made of aluminum having light weight and high heat-conductivity. Base 233 has all electric power storage elements 215 mounted thereon, and has a large surface area and a large thermal capacity accordingly. This structure facilitates uniformly transmitting heat of all storage element blocks 215 to base 233, and uniformly cools electric power storage elements 211. This equalizes the degradation of electric power storage elements 211 due to the heat, thereby providing the electric power storage unit with high reliability.

Base 233 has plural fins 241 provided on a surface of base 233 opposite to the surface having storage element blocks 215 fixed thereon. According to Embodiment 4, fins 241 are formed unitary with base 233. At least some of fins 241 are located on portions of the surface of base 233 opposite to portions of the surface of base 233 facing bottom surfaces of plural storage element blocks 215. Fins 241 are located directly under the storage element blocks 215, and efficiently radiate heat transmitting to base 233. Fan 250 can be provided a location, such as bottom surfaces of fins 241, which cooling air to fins 241 effectively reach. This structure effectively dissipates heat from fins 241 to cool storage element blocks 215 quickly.

Cover 243 made of resin is placed over base 233 so as to enclose al storage element blocks 215 entirely. Cover 243 is secured to base 233 with cover screws through screw holes 245 provided in cover 243 and base 233. Fins 241 are longer than base 233 in their depth direction, as shown in FIG. 7, hence providing step portion 246 at the boundary between base 233 and each fin 241. A bottom edge of cover 243 contacts step portion 246, and prevents cover 243 from blocking fins 241. As a result, cover 243 does not reduce cooling effects of fins 241.

Power terminals 247 are provided on cover 243 for exchanging power between the electric power storage unit and an external device. Power terminals 247 are connected to storage element blocks 215 via power cables.

Cover 243 placed on base 233 prevents air outside of the electric power storage unit from directly reaching electric power storage elements 211, hence reducing uneven dissipation of heat. Cover 243 prevents particulates in exhaust gas and dust in the outside from being attached onto storage element blocks 215 to reduce the risk of a problem, such as short-circuiting, hence providing high reliability.

As shown in FIG. 7, sealing element 249, such as an O-ring, is provided around a fitting portion (i.e., side surfaces of base 233 above screw holes 245) when cover 243 is placed on base 233. Sealing element 249 prevents air from entering from the outside of the electric power storage unit through a gap between cover 243 and base 233. This structure prevents the unit from being cooled unevenly due to the air. A space enclosed by base 233 and cover 243 is sealed and filled with dry air. The dry air prevents dew condensation inside the electric power storage unit even when the ambient temperature decreases, thus providing high reliability. The dry air has a dew point of −40° C. This temperature is the lowest temperature for storing the electric power storage unit. Dew condensation does not occur at temperatures not lower than the lowest storage temperature. Even if the temperature decreases below the lowest storage temperature, dew condensation does not occur since air having the dew point of −40° C. contains extremely small amount of water vapor.

FIG. 8 is a cross sectional view of the electric power storage unit in plane 8 shown in FIG. 7. FIG. 6 also shows a cross section of cover 243.

A structure that is not shown in FIG. 7 will be described below. Electric power storage elements 211 have a circular column, cylindrical shape having a diameter of 30 mm, for instance, and have electrodes 251 at both end surfaces thereof.

The electrode on bottom portion 252 of each electric power storage element 211 shown in FIG. 8 is unitarily formed with the cylindrical body of electric power storage element 211. Bus bar 253 is welded to the electrodes on bottom portions 252 of adjoining electric power storage elements 211 to electrically connect between adjoining electric power storage elements 211.

Electrode 251 protrudes from the top end surface of each of electric power storage elements 211. Bus bar 253 is welded to the electrode of each element to electrically connect between electric power storage elements 211 adjacent to each other. Bus bar 253 provided on the top end surfaces of electric power storage elements 211 has terminal 225 unitarily with bus bar 253 to be electrically connected to circuit board 223.

Lower holder 219 has through-holes 255 in areas of lower holder which contact bottom portions 252 and which face base 233. That is, through-holes 255 are formed in the areas where the bottom surfaces of electric power storage elements 211 contact lower holder 219 shown in FIG. 8. Through-holes 255 have a height of about 0.5 mm in order to establish both characteristics of sufficient heat dissipation and electrical insulation when the through-holes are filled with heat-conductive insulating grease 234. Since bus bars 253 welded to bottom portions 252, as shown in FIG. 8, through-holes 255 have larger cross sectional area than bus bars 253.

Lower holder 219 has step portion 256 provided at portions of lower holder 219 facing base 233. According to Embodiment 4, step portions 256 are formed unitary with lower holder 219 at the bottom surfaces of mounting portions 229. A height of step portions 256 is about 0.2 mm to maintain preferable heat dissipation from lower holder 219 to base 233.

Inner spaces of through-holes 255, gaps between lower holder 219 and bottom portions 252 (i.e., a gap between them) as well as a space between lower holder 219 and base 233 are filled with heat-conductive insulating grease 234. Heat-conductive insulating grease 234 is made of silicone-based resin mixed with filler made of ceramic (e.g. alumina). The filler may have any shapes, such as granular shapes, acicular shapes, or mixture of the shapes. This composition provides the grease with high thermal conductivity and a high insulating property.

Heat produced due to repetitive charging and discharging of electric power storage elements 211 transmits from bottom portions 252 to base 233 via heat-conductive insulating grease 234 provided in through-holes 255, as shown by the arrows in FIG. 8. Since heat-conductive insulating grease 234 is also provided in the entire surfaces between lower holder 219 and base 233, the heat from heat-conductive insulating grease 234 inside through-holes 255 transmits over a wide area of base 233, thus dissipating the heat of electric power storage elements 211 efficiently. Heat-conductive insulating grease 234 is also provided between lower holder 219 and bottom portions 252 so as to allow the heat to transmit to lower holder 219 from side surfaces of bottom portions 252. Thus, the heat of electric power storage elements 211 transmits quite efficiently to base 233 to provide excellent heat dissipation. Heat-conductive insulating grease 234 have the heat of electric power storage elements 211 transmit efficiently, and hence, allows lower holder 219 to be made of resin having a high heat-conductivity. This allows selection and use of any resin having a physical strength necessary for holding electric power storage elements 211 and good workability for injection molding as appropriate for motor vehicles.

Heat-conductive insulating grease 234 provided between lower holder 219 and base 233 has a thickness equal to the height of step portions 256 (i.e., 0.2 mm) because of step portions 256 formed under lower holder 219. This provides heat-conductive insulating grease 234 with a uniform thickness between lower holders 219 and base 233 of plural storage element blocks 215, hence reducing unevenness of the heat dissipation among storage element blocks 215.

The heat transmits to base 233 in lateral horizontal directions as well as downward direction in FIG. 8, and reaches fins 241. The large surface area of fins 241 dissipates the heat sufficiently.

A method of manufacturing storage element block 215 will be described with referring to FIGS. 9A to 9F in which heat-conductive insulating grease 234 is applied to the interior spaces of through-holes 255, the gaps between lower holder 219 and bottom portions 252, and the space between lower holder 219 and base 233.

First, lower holder 219 is fixed to assembling table 257 by tightening lower holder mounting screws 231 through mounting portions 229 into assembling table 257 after fixing rods 221 is previously attached to lower holder 219, as shown in FIG. 9A. Lower holder 219 and fixing rods 221 are fixed with screws, but can be unitary formed with each other into one piece instead.

Then, heat-conductive insulating grease 234 is injected into through-holes 255. The amount of heat-conductive insulating grease 234 to be injected is previously determined to be an amount at least sufficient to fill the interior spaces of through-holes 255 and the gaps between lower holder 219 and bottom portions 252. This amount is therefore larger than a total volume of the interior spaces of through-holes 255. A dispenser is used for injecting the predetermined amount of heat-conductive insulating grease 234.

After having injected heat-conductive insulating grease 234, bottom portions 252 of electric power storage elements 211 are inserted in lower holder 219, as shown by arrows shown in FIG. 9A. Prior to this process, bus bars 253 are connected to bottom portions 252 by welding since they cannot be connected after the manufacturing process.

When bottom portions 252 of electric power storage elements 211 are inserted in lower holder 219, parts of bottom portions 252 contact parts of lower holder 219, and the internal spaces of through-holes 255 are filled completely with heat-conductive insulating grease 234, as shown in FIG. 9B. Since the amount of injected heat-conductive insulating grease 234 is larger than the volume of the internal spaces of through-holes 255, as mentioned above, an excess amount of the grease rises through the gaps between lower holder 219 and bottom portions 252 and fills the gaps. The interior spaces of through-holes 255 and the gaps between lower holder 219 and bottom portions 252 are thus filled with heat-conductive insulating grease 234. This process can spread heat-conductive insulating grease 234 out into the gaps without producing air bubbles that prevent the heat from transmitting since electric power storage elements 211 are inserted into lower holder 219 while compressing heat-conductive insulating grease 234 with bottom portions 252. A portion of heat-conductive insulating grease 234 also spreads out into the gaps formed by step portions 256 between lower holder 219 and assembling table 257.

Then, upper holder 217 is inserted in electric power storage elements 211. Electrodes 251 are not covered with upper holder 217 at this moment time since electrode openings 259 is provided in upper holder 217 at positions facing electrodes 251. Bus bars 253 are then connected, by welding, to electrodes 251 exposed from electrode openings 259.

FIG. 9C shows the storage element block manufactured up to the above processes. Bus bars 253 are unitarily formed with terminals 225. Circuit board 223 is fixed to the terminals by inserting the circuit board and electrically and mechanically connecting to terminals 225 by soldering. At this moment, fixing screws 261 having flat heads screw are tightened to engage mechanically the upper holder with fixing rods 221. The flat head screws avoid the screw heads from protruding from upper holder 217. The process of the connecting of bus bars 253 to electrodes 251 by welding and the process of tightening fixing screws 261 can be executed in any order.

Then, storage element block 215 is removed from assembling table 257, as shown in FIG. 9D. More specifically, storage element block 215 is lifted after lower holder fixing screws 231 are removed. This process attaches heat-conductive insulating grease 234 to both of lower holder 219 and assembling table 257, and causes the grease to have an undulated surface, as shown in FIG. 9D.

The removed storage element block 215 is then turned upside down in order to apply additional amount of heat-conductive insulating grease 234 to the height of step portions 256 on the bottom surface of lower holder 219 and to flatten the undulated surface of the grease. FIG. 9E shows storage element block 215. Heat-conductive insulating grease 234 is applied to the bottom surface of lower holder 219 except for step portions 256 by moving squeegee 263 in the direction of an arrow. In this case, the heads of fixing screws 261 do not protrude from upper holder 217 since fixing screws 261 have the flat heads, as described above. This arrangement allows storage element block 215 to be placed stably in the upside down position to facilitate applying heat-conductive insulating grease 234 accurately with squeegee 263.

FIG. 9F shows storage element block 215 having grease 234 applied. Squeegee 263 can apply heat-conductive insulating grease 234 smoothly on the entire bottom surface of lower holder 219 including through-holes 255 (except for step portions 256). Even including air bubbles, the second application of heat-conductive insulating grease 234 with squeegee 263 can eliminate the air bubbles.

Then, storage element block 215 is turned again into the upright position, and is fixed onto base 233 with lower holder fixing screws 231, as shown in FIG. 8, thus terminating the manufacturing processes.

The above method applies heat-conductive insulating grease 234 uniformly without developing air bubbles in any of the spaces inside through-holes 255, between lower holder 219 and bottom portions 252, and between lower holder 219 and base 233, hence allowing the heat of electric power storage elements 211 to transmit evenly and efficiently to base 233.

The above structure thermally couples bottom portions 252 of electric power storage elements 211 with base 233 to dissipate the heat uniformly, and reduces cooling unevenness, thus providing the electric power storage unit with high reliability.

In the method of manufacturing storage element block 215 according to Embodiment 4, storage element block 215 is mounted to base 233 after storage element block 215 is assembled once on assembling table 257. the block can be manufactured by fixing lower holder 219 onto base 233 from the beginning without assembling table 257. As illustrated previously, however, many, several tens of storage element blocks 215 are mounted onto base 233 and accordingly, base 233 has a large surface area. Such large area of the base prevents the unit from being manufactured easily, and hence, assembling table 257 is used instead.

According to Embodiment 4, lower holder 219 has step portions 256 formed unitarily with the lower holder. Instead, spacers can be inserted between lower holder 219 and base 233 to provide step portions 256. The spacers may be washers having a thickness of 0.2 mm and placed under mounting portions 229 to allow lower holder fixing screws 231 pass through them so as to be positioned easily. The spacers can be made of heat-conductive material, such as metal or carbon, having a thermal conductivity not smaller than that of lower holder 219. The spacers can further facilitate heat dissipation from lower holder 219 to base 233 although the number of components increases as compared with the structure provided with step portions 256.

According to Embodiment 4, through-hole 255 has a cross sectional area constant from an opening thereof contacting bottom portions 252 of electric power storage elements 211 to an opening thereof facing base 233. In other words, a wall of through-hole 255 in its height direction is vertically straight. Through-hole 255 may have a sectional area increasing to flare from the opening contacting bottom portions 252 toward the opening facing base 233, that is, the wall of through-hole 255 extends in a direction slanting with respect to base 233, as shown by the dotted line in FIG. 10. This shape of the through-hole requires a larger amount of heat-conductive insulating grease 234 than the shape of the through-hole shown in FIG. 8, and facilitates the heat to transmit accordingly, thereby increasing efficiency of the heat dissipation.

The unit according to Embodiment 4 includes fins 241 provided on base 233. The unit does not necessarily include fins 241 if base 233 has a thermal capacity sufficient to heat dissipation. A water passage passing allowing water circulating therein may be provided in base 233 or on a surface of the base if even fins 241 and a fan do not provide sufficient heat dissipation.

According to Embodiment 4, electric power storage element 211 is an electric double layer capacitor, and can be an electrochemical capacitor or a secondary battery having problems to heat.

The electric power storage unit according to Embodiment 4 is applicable not only to a power supply for a hybrid electric vehicle, but also to an auxiliary power supply for any vehicle equipped with a system, such as an idling-stop mechanism, an electric power steering, or an electric supercharger, that requires charging and discharging of electric power storage elements 211 repetitively in a short period of time. The electric power storage unit is applicable to an emergency power supply besides an auxiliary power supply for motor vehicles.

Exemplary Embodiment 5

An electric power storage unit according to Exemplary Embodiment 5 of the present invention will be described with referring to drawings. The structure of the electric power storage unit according to Embodiment includes an elastic portion having a cantilever structure provided in the through-hole of the unit according to Embodiment 4 for the purpose of compensating variations in height of electric power storage elements.

Figure 11:
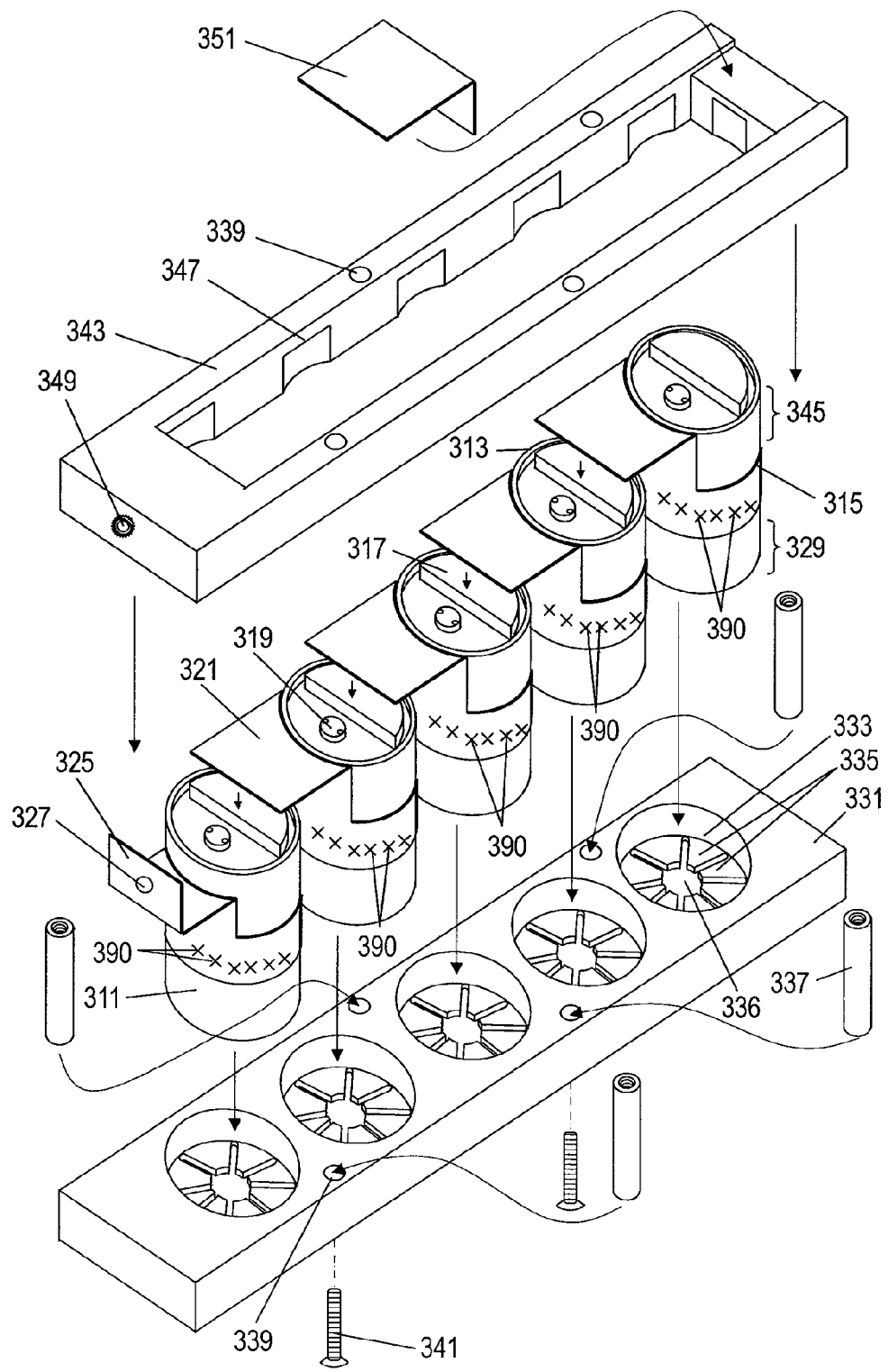
FIG. 11 is an exploded perspective view of an electric power storage unit according to Exemplary Embodiment 5 of the invention.
Figure 12:
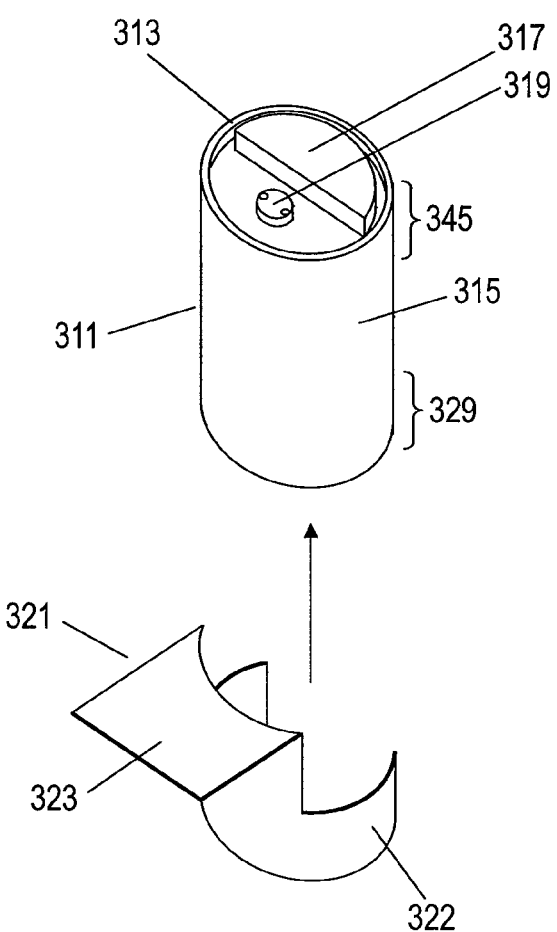
FIG. 12 is a perspective view of an electric power storage element and a bus bar of the electric power storage unit according to Embodiment 5.
Figure 13:
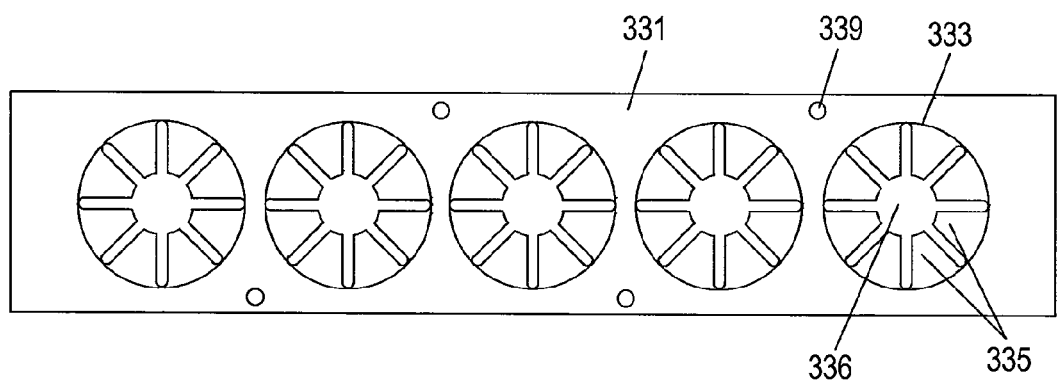
FIG. 13 is a plan view of a lower case of the electric power storage unit according to Embodiment 5.
Figure 14:
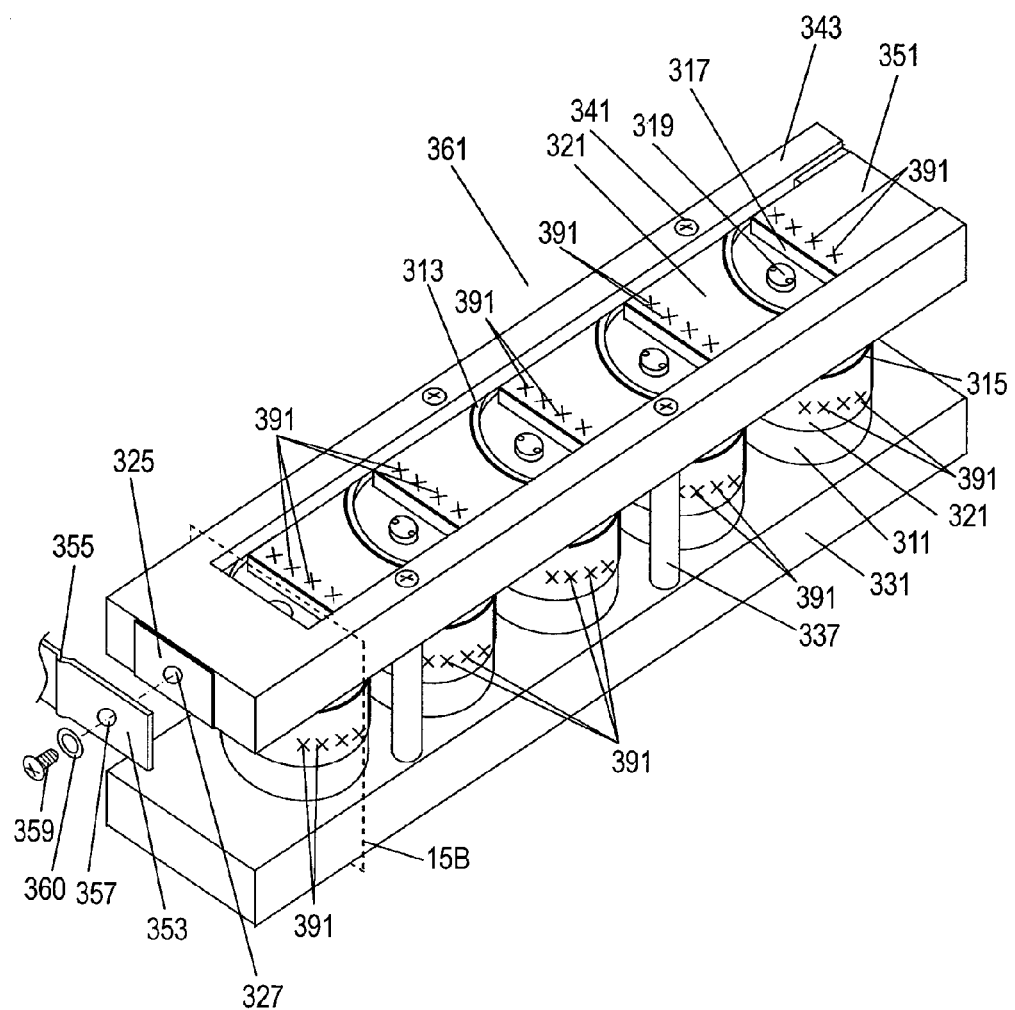
FIG. 14 is a perspective view of the electric power storage unit according to Embodiment 5.
Figure 15A:
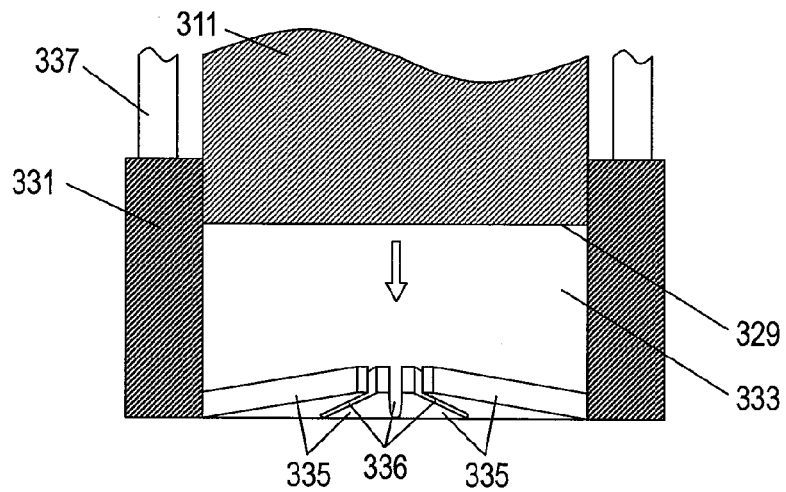
FIG. 15A is a cross sectional view of the electric power storage unit according to Embodiment 5.
Figure 15B:
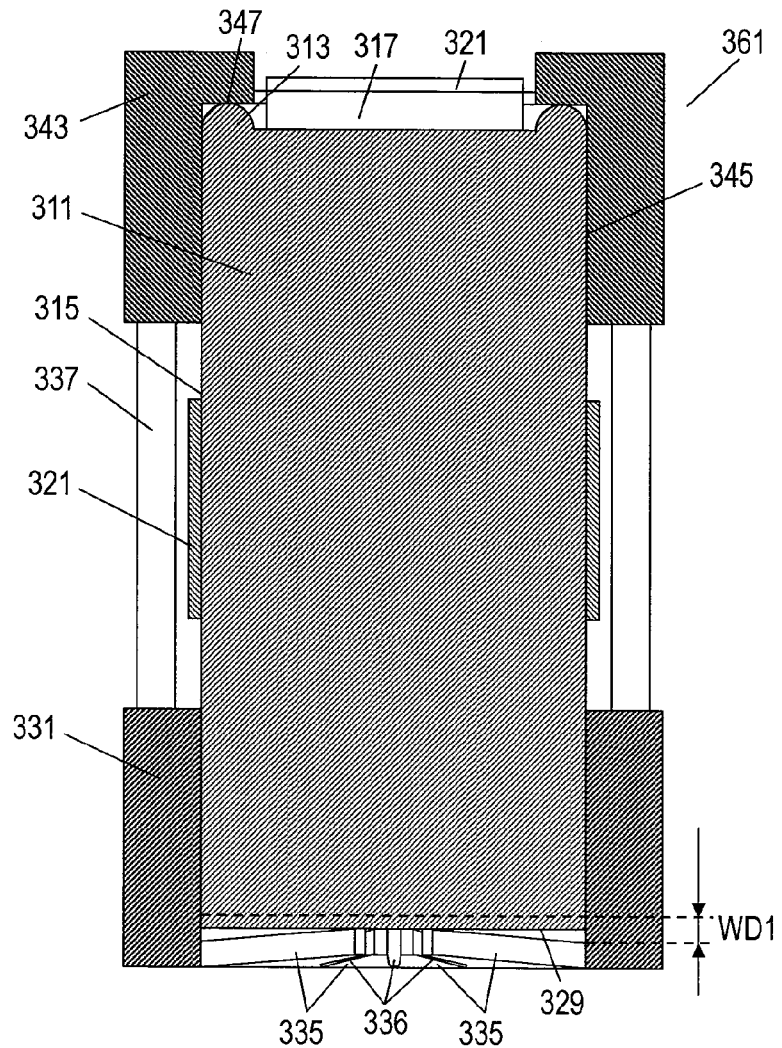
FIG. 15B is a cross sectional view of the electric power storage unit according to Embodiment 5.
Figure 16A:
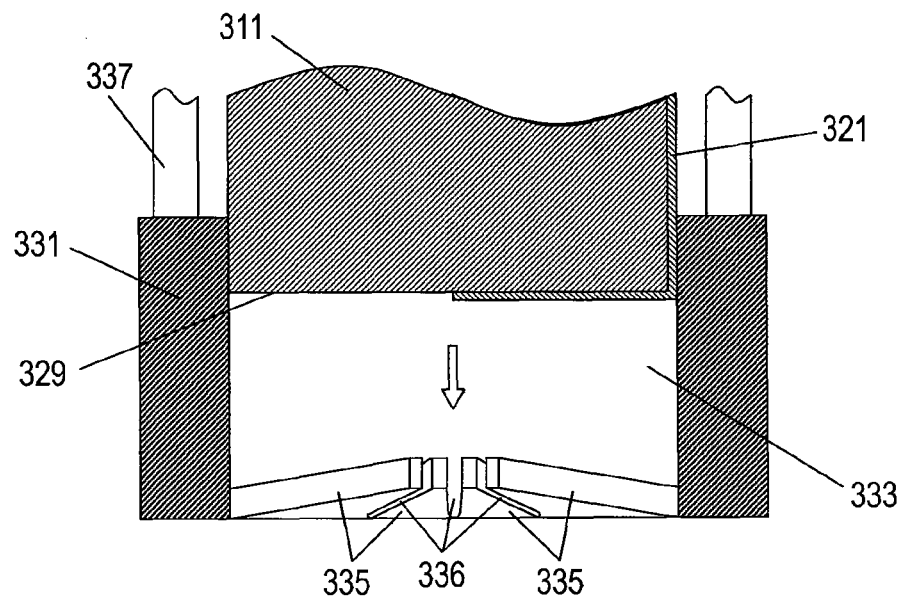
FIG. 16A is a cross sectional view of another electric power storage unit according to Embodiment 5.
Figure 16B:
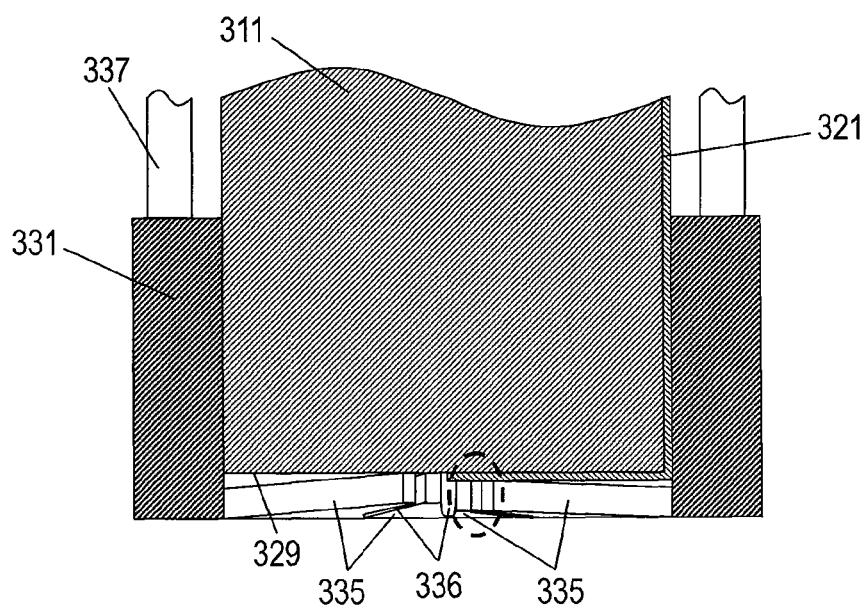
FIG. 16B is a cross sectional view of the electric power storage unit according to Embodiment 5.

FIG. 11 is an exploded perspective view of the electric power storage unit according to Embodiment 5. FIG. 12 is a perspective view of an electric power storage element and a bus bar of the electric power storage unit according to Embodiment 5. FIG. 13 is a plan view of a lower case of the electric power storage unit according to Embodiment 5. FIG. 14 is a perspective view of a completed electric power storage unit according to Embodiment 5. FIGS. 15A and 15B are cross sectional views of the electric power storage unit according to Embodiment 5. FIG. 15A is a sectional view of the electric power storage unit having the electric power storage elements inserted in the lower case. FIG. 15B is a sectional view of the completed electric power storage unit. FIGS. 16A and 16B are cross sectional views of another electric power storage unit according to Embodiment 5. FIG. 16A is a sectional view of the electric power storage unit having the electric power storage elements inserted in the lower case. FIG. 16B is a sectional view of the unit after the elements are inserted.

As shown in FIG. 11, electric power storage elements 311 for storing power are electric double layer capacitors having a circular column, cylindrical shape having a diameter of, e.g. 3 cm. Electric power storage elements 311 can be manufactured in the same manner as ordinary batteries having a cylindrical shape. Peripheral end rim 313 protruding by a process of caulking at an end surface (a top surface in FIG. 11) of electric power storage element 311. The cylindrical side surface of electric power storage element 311 is made of aluminum and connected internally to function as a negative electrode. The cylindrical side surface of electric power storage element 311 thus forms side electrode 315 entirely. The end surface function a cap which is made of aluminum. End electrode 317 is formed by pressing the end surface to have a semicircular shape. End electrode 317 has a height exceeding peripheral end rim 313. End electrode 317 is connected internally to function as a positive electrode. An insulator is placed securely between the cylindrical side surface and the cap of electric power storage element 311. Regulator valve 319 is provided on the cap and next to end electrode 317. Regulator valve 319 releases a pressure when an electrolyte filling an inside of electric power storage element 311 starts evaporating. The valve hence prevents an internal pressure in electric power storage element 311 from rising.

Bus bars 321 will be described below. Bus bars 321 electrically and mechanically connects plural electric power storage elements 311 arranged in a row with each other. Bus bars 321 are made of aluminum identical to material of side electrode 315 and end electrode 317. Aluminum is used for all these elements since side electrode 315 and end electrode 317 are connected by welding to internal electrodes of the electric double layer capacitor that are made of aluminum. They may be made of other metal as long as they all are made of the same metal. Bus bars 321 are also made of aluminum since bus bars 321 are connected to side electrode 315 and end electrode 317 by welding. The same metal facilitates the welding and provides an anticorrosive property since the metal does not create a local battery due to moisture.

Bus bar 321 has circumferential portion 322 fitted to the side surface of electric power storage element 311 and flat portion 323 welded to end electrode 317 of another electric power storage element 311 adjoining, as shown in FIG. 12.

Portions 322 and 323 are unitarily formed by pressing an aluminum plate having a thickness of 0.5 mm. Bus bar 321 may have a flexible portion between a side (flat portion 323) connected to end electrode 317 and the other side (circumferential portion 322) connected to side electrode 315. The flexible portion absorbs a stresses exerted on bus bar 321 in the process of welding and while being subjected to vibrations inside a vehicle as well as deformation due to thermal expansions, thereby improving reliability. The flexible portion may be formed in flat portion 323 to easily form the bus bar.

Bus bar 321 is fitted to the side surface of electric power storage element 311 in the direction shown in FIG. 12, and connected by laser welding to electrically and mechanically contact side electrode 315 reliably. FIG. 11 shows laser-welding points 390. FIG. 11 shows multiple points of spot welding. The welding may be executed in a linear form by shifting the welding position continuously, thereby providing higher reliability of the connection than the spot welding. Thus, electric power storage element 311 is combined with bus bar 321.

Bus bar 321 is connected to electric power storage elements 311 other than one electric power storage element 311 having side electrode 315 having either the highest voltage or the lowest voltage among the side electrodes 315 of electric power storage elements 311. According to Embodiment 5, five electric power storage elements 311 are connected in series, as shown in FIG. 11, and the element which is shown at the nearest location in FIG. 11 has side electrode 315 having the lowest voltage since side electrodes 315 are negative electrodes and end electrodes 317 are positive electrodes. Bus bars 321 are connected to four electric power storage elements 311 other than the element shown at the nearest location. The electric power storage element 311 shown at the nearest location has side electrode 315 having the highest voltage if the internal connections of the electrodes are reversed in electric power storage elements 311. The structure of the electric power storage unit remains unchanged even in this case except that only the positive and negative polarities are reversed.

Negative bus bar 325 is connected to electric power storage element 311 shown at the nearest location, instead of bus bar 321. Negative bus bar 325 has a structure similar to that of bus bar 321 except that negative electrode 325 does not have the portion connected to end electrode 317 since no further electric power storage element is located next to it. Negative bus bar 325 has screw hole 327 arranged to be connected to a power line or an external bus bar, which is to be connected electrically with an external system outside of the electric power storage unit, as described later. Negative bus bar 325 is bent to have a shape fitting to an end of an upper case, as described later, to facilitate the connection to the power line or the external bus bar. This portion of bus bar 325 can have other shapes as appropriate according to a configuration of the electric power storage unit, routing of the power line and the like without being restricted by the structure shown in FIG. 11. Negative bus bar 325 connected to side electrode 315 of electric power storage element 311 shown at the nearest location by welding similarly to bus bars 321 connected to the other electric power storage elements 311.

Each of electric power storage elements 311 having either bus bar 321 or negative bus bar 325 connected thereto is then inserted in retaining hole 333 provided in lower case 331 while bottom portion 329 of element 311 is directed down into retaining hole 333. Retaining holes 333 have a diameter larger than an outer diameter of electric power storage elements 311 by, e.g. about 0.1 to 0.2 mm, hence allows electric power storage elements 311 to be inserted smoothly therein Lower case 331 is made of resin. Each of retaining holes 333 has plural elastic portions 335 formed unitarily with a bottom of each of holes 333. Elastic portions 335 have a cantilever structure extending upwardly and toward the center from a wall surface at the bottom of retaining hole 333. That is, an end of elastic portion 335 is fixed to the wall surface, and another end of elastic portion 335 is not fixed and displaceable. According to Embodiment 5, eight elastic portions 335 each having the cantilever structure having a sectorial shape, as shown in FIG. 11. Gaps provided between adjoining elastic portions 335 and in a center part of the bottom of retaining hole 333 are through-hole 336. FIG. 13 is a plan view of lower case 331 as seen from the above, and shows the shape of through-hole 336. Through-hole 336 includes a circular hole provided in the center of the bottom of retaining hole 333 and radial slits extending in eight directions from the circular hole. Each end of the radial slits connected with the wall surface of retaining hole 333 is rounded, as shown in FIG. 13. This round shape prevents a stress exerted on the wall surface of elastic portions 335 from concentrating. The hole provided in the center of the bottom of retaining hole 333 has a circular shape, that is, each elastic portion 335 has the sectorial shape having a circular arcuate tip. However, the tip can have another shape, such as a linear shape.

The tip of each elastic portion 335 is located above the bottom of retaining hole 333 since elastic portion 335 has the cantilever structure extending upward and toward the center from the wall surface at the bottom of retaining hole 333. As shown in FIG. 11, when bottom portion 329 of electric power storage element 311 contacts elastic portion 335, the tip of each elastic portion 335 is depressed downward. In this case, a height of the tip of elastic portion 335 from the bottom of retaining hole 333, i.e., a displaceable range of elastic portion 335 is larger than a variation of the heights of electric power storage elements 311 which is previously calculated. This structure offsets the difference of the heights of electric power storage elements 311 even if elements 311 having various heights are inserted, thus holding elements 311 securely.

When electric power storage elements 311 are inserted in retaining holes 333, the bottom surfaces of elements 311 are exposed from through-holes 336 provided in the bottoms of retaining holes 333. This arrangement dissipates the heat from through-holes 336. Upon air flowing to holes 333, the heat is dissipated more.

An area of through-hole 336, which is defined as a projected area of through-hole as seen from above, as shown in FIG. 13, is preferably larger than a total area of elastic portions 335 in the bottom of retaining hole 333 in order to allow the end surface of bottom portion 329 to be exposed as much as possible. However, through-hole 336 having an excessively larger area provides the following problem.

The hole at the center of through-hole 336 shown in FIG. 11 having an excessively large size decreases the length of elastic portions 335. If elastic portions 335 maintain the displaceable range not smaller than the variation of the heights of electric power storage elements 311, a large stress may be applied onto the bottom surface of electric power storage element 311 when electric power storage element 311 is inserted in retaining hole 333 for manufacturing the electric power storage unit. This large stress may damage elastic portions 335 or deform the bottom surface of electric power storage element 311.

If the radial slits of through-holes 336 have an excessively large width, elastic portions 335 have a small width accordingly, hence reducing a force holding electric power storage element 311. Then, elastic portions 335 may not hold electric power storage element 311 properly against stresses produced due to, e.g. vibrations of the vehicle.

The area of through-hole 336 is preferably as large as possible within a range appropriate to ensure the displaceable range and the retaining force necessary for elastic portions 335 to hold electric power storage element 311. The number of elastic portions 335 is eight in the unit according to Embodiment 5, but may be determined to make the area of through-hole 336 as large as possible under the above conditions. The design of these structures change depending on conditions, such as the size and weight of electric power storage element 311, vibrations applied within a vehicle and a required characteristic of heat dissipation, and these conditions shall therefore be taken into consideration as appropriate in the designing.

The structure shown in FIG. 11 will be described. Fixing rods 337 are previously secured to lower case 331 in order to fix lower case 331 securely to the upper case, which will be described later. The unit according to Embodiment 5 includes four fixing rods 337. Fixing rods 337 has a threaded screw at each end thereof. Lower case 331 has screw holes 339 formed therein. Fixing rods 337 are positioned at screw holes 339 and fixed to lower case 331 by tightening fixing screws 341. Fixing screws 341 have flat heads so that the screw heads do not protrude from lower case 331.

Next, electric power storage elements 311 are inserted in retaining holes 333 in lower case 331 in the order from the element shown at the nearest location in FIG. 11 to the element shown at the farthest location in FIG. 11. Flat portion 323 of bus bar 321 is placed on an upper surface of end electrode 317 of adjoining electric power storage element 311 when they are inserted one after another. Flat portion 323 of bus bar 321 attached to one electric power storage element 311 contacts end electrode 317 of the adjacent electric power storage element 311. Bus bar 321 is not placed on end electrode 317 of electric power storage element 311 shown at the furthest location in FIG. 11 since no electric power storage element is located next to it. End electrode 317 of this element is connected with a positive bus bar described later.

After electric power storage elements 311 is inserted in lower case 331, top portions 345 of electric power storage elements 311 are inserted in upper case 343. Upper case 343 has a rectangular frame shape as seen from above so that bus bars 321 and regulator valves 319 are exposed. Upper case 343 has contact portions 347 contacting respective parts of peripheral end rims 313 of electric power storage elements 311. Contact portions 347 are formed unitarily with the upper case, and function as reference points for fixing electric power storage elements 311. According to Embodiment 5, contact portions 347 contact respective parts of peripheral end rims 313, but may contact peripheral end rims entirely. Upper case 343 has screw holes 339 similar to the screw holes of lower case 331 for mechanically connecting to fixing rods 337. Upper case 343 has insert nut 349 embedded in a position corresponding to screw hole 327 of negative bus bar 325. End electrode 317 of electric power storage element 311 shown at the furthest location in FIG. 11 has the highest voltage, and has positive bus bar 351 for external connection mounted thereon. Upper case 343 has another insert nut embedded in a position corresponding to a screw hole provided in positive bus bar 351 similarly to screw hole 327 of negative bus bar 325. All of the above structural elements are unitarily formed by injection molding since upper case 343 is made of resin identical to material of lower case 331.

When top portions 345 of electric power storage elements 311 are inserted into upper case 343, parts of peripheral end rims 313 of electric power storage elements 311 contact portions 347. Elastic portions 335 exert forces on electric power storage elements 311 to move upward in the upward direction of FIG. 11, and produces gaps between upper case 343 and fixing rods 337 accordingly. Fixing screws 341 are then tightened while upper case 343 is depressed to close the gaps, thereby fixing upper case 343 to lower case 331.

FIG. 14 shows the electric power storage unit manufactured up to the above processes. Each of bus bars 321 is placed on end electrode 317 of the next electric power storage element 311, and is connected electrically and mechanically to end electrode 317 by laser welding. Bus bars 321 does not contact peripheral end rims 313 to be prevented from short-circuiting since end electrodes 317 protrude above peripheral end rims 313. FIG. 14 shows laser-welding points 391. The laser welding may be executed at multiple points by spot welding or continuously in a linear form as illustrated in the process of laser welding to side electrodes 315.

At this moment, positive bus bar 351 is placed on end electrode 317 of electric power storage element 311 shown at the furthest location in FIG. 14, and are connected by laser welding similarly to other bus bars 321. This allows connection of external wiring to positive bus bar 351. A bent portion of negative bus bar 325 is fixed to upper case 343, as shown in FIG. 14, thereby being connected to an external wiring. According to Embodiment 5, external bus bar 353 is connected as the external wiring. External bus bar 353 is made of copper and has a thickness of 1 mm. External bus bar 353 has flexible portion 355 formed unitarily as a part thereof. Flexible portion 355 absorbs stresses exerted on external bus bar 353 due to vibrations or thermal expansions while external bus bar 353 is fixed to bus bar 325. External bus bar 353 has screw hole 357 for fixing external bus bar 353 with a screw. That is, external bus bar 353 is connected to negative bus bar 325 with positioning screw hole 357 of external bus bar 353 which is positioned on screw hole 327 of negative bus bar 325 and screw 359 tightened into insert nut 349 through washer 360. Positive bus bar 351 is connected by the same method. Another end of external bus bar 353 is connected to another electric power storage unit 361, which is not illustrated in FIG. 14. Thus, a large number of electric power storage units 361 can be connected in this manner.

Spaces are provided between electric power storage elements 311 adjacent to each other while elements 311 are inserted in upper case 343 and lower case 331. The length of flat portions 323 of bus bars 321 increases according to the width of the spaces, and allows bus bars 321 to deform easily. This structure reduces the influence of pressing forces exerted on electric power storage elements 311 by bus bars 321 of the adjoining electric power storage elements 311 since bus bars 321 can deform easily when electric power storage elements 311 are depressed by contact portions 347, thereby allowing electric power storage elements 311 to be fixed independently. Each bus bar 321 may preferably have provide a flexible portion absorbing the influence of the pressing forces produced by bus bars 321 of the adjoining electric power storage elements 311.

FIGS. 15A and 15B are cross sectional views of the electric power storage unit in plane 15B shown in FIG. 14. The cross sectional view of FIG. 15A illustrates a part of electric power storage unit 361 in which bottom portion 329 of electric power storage element 311 is inserted in the direction of an arrow into retaining hole 333 in lower case 331 having fixing rods 337 which is previously mounted. The cross sectional view of FIG. 15B illustrates completed electric power storage unit 361. Note that the clearance between electric power storage element 311 and retaining hole 333 provided by a difference in their diameters is not shown in FIG. 15A or 15B.

As discussed above, the tips of elastic portions 335 shown in FIG. 15A extend upward since elastic portions 335 have the cantilever structure extending upward and toward the center of retaining hole 333 from the wall surface of retaining hole 333. After electric power storage element 311 is completely inserted in retaining hole 333, upper case 343 is placed on top portion 345 of electric power storage element 311, and then, fixing screws 341 are tightened to fix upper case 343 to fixing rods 337 while the end surface of bottom portion 329 contacts the tips of elastic portions 335. Elastic portions 335 allow contact portions 347 to depress respective parts of peripheral end rim 313 of electric power storage element 311 downward, as shown in FIG. 15B. Fixing screws 341 are not shown in FIG. 15B since screws 341 have the flat heads. Bottom portion 329 of electric power storage element 311 thus depresses elastic portions 335 downward and is fixed. Each elastic portion 335 has displaceable range WD1 shown by arrows in FIG. 15B is larger than the variation in the heights of electric power storage elements 311. The amount of the displacement of elastic portions 335 changes with respect to contact portion 347 within displaceable range WD1 so as to absorb the variations of the heights of electric power storage elements 311. This structure reliably holds all electric power storage elements 311 and reduces stresses applied to welded portions and bus bars 321 due to vibrations of the vehicle, thus providing high reliability. In addition, the heat generated by electric power storage elements 311 is dissipated via throughholes 336 provided in the center parts and between elastic portions 335 on the bottoms of retaining holes 333 if electric power storage unit 361 is located to allow air to circulate through the bottom surface of lower case 331. This structure provides preferable heat dissipation and high reliability.

Thus, through-hole 336 which dissipates the heat of electric power storage elements 311 and elastic portions 335 which absorb the variation of the heights of bus bars 321 reduce fatigue due to stress the heat of electric power storage elements 311 and the deformation of bus bar 321, thus providing the electric power storage unit with high reliability.

In the structure shown in FIGS. 11 to 15B, bus bar 321 is not attached to the bottom surfaces of electric power storage elements 311 since electric power storage element 311 has side electrodes 315. If electric power storage element 311 has electrodes on end surfaces of the cylindrical shape of element 311, bus bar 321 is also connected to the bottom surfaces of electric power storage elements 311. FIGS. 16A and 16B are cross-sectional views of electric power storage unit 361 having this structure. The cross sectional view of FIG. 16A illustrates a part of electric power storage unit 361 where bottom portion 329 of electric power storage element 311 is inserted in the direction of an arrow into retaining hole 333 in lower case 331 having fixing rods 337 previously mounted. The cross sectional view of FIG. 16B illustrates the same part after electric power storage element 311 is inserted. FIGS. 15A and 15B do not show the clearance between electric power storage element 311 and retaining hole 333 provided by the difference in their diameters.

Bus bar 321 has an and connected to the bottom surface of bottom portion 329 of electric power storage element 311 and another end extending upward and connected to another electric power storage element 311. Bus bar 321 has a cross section having an L-shape along bottom portion 329, as shown in FIG. 16A. When bottom portion 329 is inserted into retaining hole 333 in the direction of the arrow, the bottom surface of bottom portion 329 contacts and depresses the tips of elastic portions 335. The bottom surface of bottom portion 329 is not flat, as shown in FIGS. 15A and 15B because of bus bar 321 connected to the bottom surface. In this case, some of elastic portions 335 contacting some of bus bar 321 (i.e., two at the right side), as encircled by the dotted line in FIG. 16B, deform more than the other elastic portions 335 by the thickness of bus bar 321. This structure reliably fixes all electric power storage elements 311 even having bus bar 321 connected to the bottom surfaces of electric power storage elements 311 since elastic portions 335 absorb not only the variation of the heights of electric power storage elements 311 but also unevenness on the bottom surfaces due to the thickness of bus bars 321. The more the number of elastic portions 335 the more the unevenness on the bottom surfaces is absorbed.

According to Embodiment 5, screw 359 is tightened into insert nut 349. Upper case 343 may have a recess having inner dimensions for fitting the nut in the location corresponding to screw hole 327 to have the recess accommodate the nut therein. In this case, screw 359 can be tightened without causing the nut to turn together since angled edges of the nut contact the inner walls of the recess. This structure can be employed at the side where positive bus bar 351 is connected.

Exemplary Embodiment 6

Figure 17A:
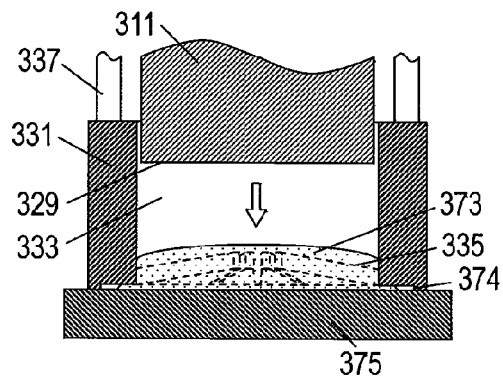
FIG. 17A is a cross sectional view of an electric power storage unit for illustrating a method of manufacturing the electric power storage unit according to Exemplary Embodiment 6 of the invention.
Figure 17D:
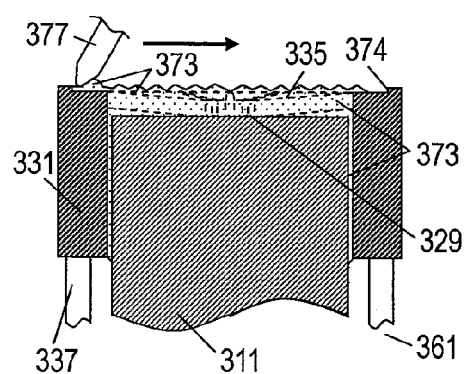
FIG. 17D is a cross sectional view of the electric power storage unit for illustrating the method of manufacturing the electric power storage unit according to Embodiment 6.
Figure 17B:
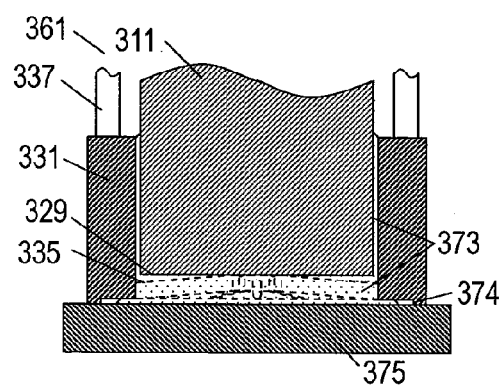
FIG. 17B is a cross sectional view of the electric power storage unit for illustrating the method of manufacturing the electric power storage unit according to Embodiment 6.
Figure 17E:
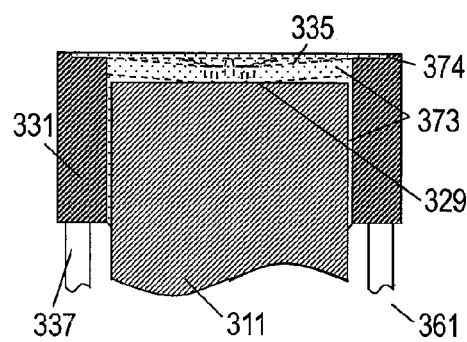
FIG. 17E is a cross sectional view of the electric power storage unit for illustrating the method of manufacturing the electric power storage unit according to Embodiment 6.
Figure 17C:
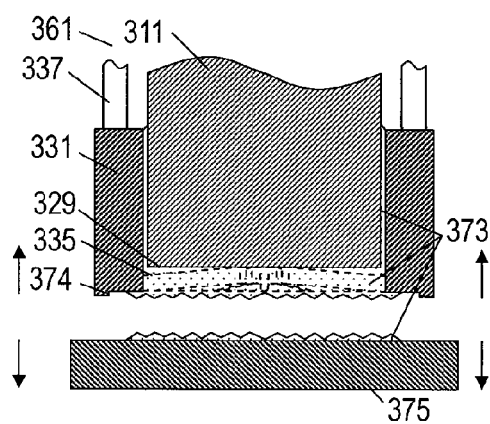
FIG. 17C is a cross sectional view of the electric power storage unit for illustrating the method of manufacturing the electric power storage unit according to Embodiment 6.
Figure 17F:
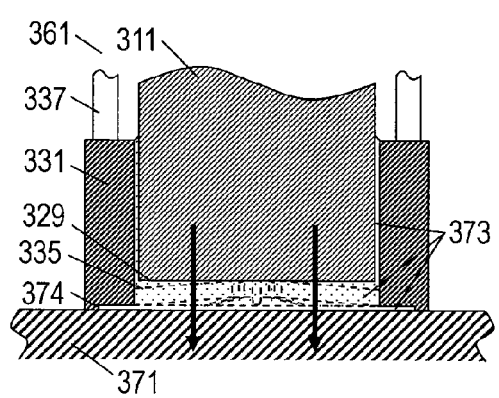
FIG. 17F is a cross sectional view of the electric power storage unit for illustrating the method of manufacturing the electric power storage unit according to Embodiment 6.

FIGS. 17A to 17F are cross sectional views of an electric power storage unit according to Exemplary Embodiment 6 of the present invention for illustrating a method of manufacturing the unit. FIG. 17A is a cross sectional view of the electric power storage unit having an electric power storage element inserted into a lower case. FIG. 17B is a cross sectional view of the electric power storage element which in completed. FIG. 17C is a cross sectional view of the unit having the electric power storage unit removed from an assembling table. FIG. 17D is a cross sectional view of the unit having heat-conductive insulating grease applied to a bottom surface of the lower case. FIG. 17E is a cross sectional view of the unit having the heat-conductive insulating grease is completed to apply onto the bottom surface of the lower case. FIG. 17F is a cross sectional view of the unit mounted on a base. In FIGS. 17A to 17F, a clearance between electric power storage element 311 and retaining hole 333 created by a difference of their diameters is illustrated larger than an actual size for easy explanation.

According to Embodiment 6, components identical to those of Embodiment 5 are denoted by the same reference numerals, and their detail description will be omitted. The unit according to Embodiment 6 provides heat dissipation even if an electric power storage apparatus includes plural electric power storage units 361 arranged such that air does not circulate under the bottom surface of lower case 331. The unit according to Embodiment 6 has the following features in addition to the features of the unit according to Embodiment 5:

(1) Plural electric power storage units 361 are arranged such that lower case 331 of each unit 361 is fixed to base 371 made of metal;

(2) Heat-conductive insulating grease 373 is applied between bottom portions 329 of electric power storage elements 311 and base 371 and between lower cases 331 and base 371; and (3) Lower case 331 has step portions 374 at portions of case 331 facing base 371.

According to Embodiment 6, base 371 is made of aluminum having high heat conductivity and a small weight. Heat-conductive insulating grease 373 is made of, for example, silicone resin mixed with filler made of ceramic (e.g., alumina). Step portions 374 are formed as unitary portions of lower case 331 with a height of about 0.2 mm to cause heat to transmit well from lower case 331 to base 371. Step portions 374 allow heat-conductive insulating grease 373 provided between lower case 331 and base 371 to have a thickness equal to the height of step portions 373 (0.2 mm). This structure provides uniform thicknesses of heat-conductive insulating grease 373 between lower cases 331 and base 371 for electric power storage units 361 placed on base 371, thereby reducing unevenness of the heat dissipation among electric power storage units 361.

A method of manufacturing the unit will be described below with reference to FIGS. 17A to 17F.

First, lower case 331 having fixing rods 337 previously attached is mounted onto assembling table 375, as shown in FIG. 17A. The lower case is fixed by tightening screws into assembling table 375 through screw holes provided in mounting portions formed unitarily with lower case 331.

Next, heat-conductive insulating grease 373 is injected on the bottom of retaining hole 333. The amount of heat-conductive insulating grease 373 to be injected is previously determined to sufficiently fill a gap provided between bottom portion 329 and base 371 after electric power storage unit 361 is mounted on base 371. According to Embodiment 6, elastic portions 335 are buried in heat-conductive insulating grease 373 after the predetermined amount of heat-conductive insulating grease 373 is injected, as shown by the dotted line in FIG. 17A. Through-hole 336 is thus filled with heat-conductive insulating grease 373. A dispenser is used for injecting the predetermined amount of heat-conductive insulating grease 373.

Next, bottom portion 329 of electric power storage element 311 is inserted into retaining hole 333 in the direction of an arrow. Upper case 343 is fixed to fixing rods 337 in the same manner as Embodiment 5. Then, bus bars 321 are welded to be connected, thus completing electric power storage unit 361. FIG. 17B is a cross sectional view of lower case 331 and the vicinity thereof in the completed unit. Bottom portion 329 inserted in retaining hole 333 causes the bottom surface of bottom portion 329 to contact and depress respective tips of elastic portions 335. This structure absorbs a variation of the heights of electric power storage elements 311 and holds the elements reliably similarly to the unit according to Embodiment 5.

The gap surrounded by the bottom surface of bottom portion 329, a wall surface of retaining hole 333, and assembling table 375 is filled with heat-conductive insulating grease 373. As bottom portion 329 is inserted in retaining hole 333, heat-conductive insulating grease 373 rises through a space (i.e., clearance) between the hole and the element so as to fill the space. As a result, all the spaces and the clearance between bottom portion 329 and retaining hole 333 are completely filled with heat-conductive insulating grease 373. Since electric power storage element 311 is inserted into retaining hole 333 while compressing heat-conductive insulating grease 373 with bottom portion 329, heat-conductive insulating grease 373 can be spread without producing air bubbles that may affect heat dissipation. A part of heat-conductive insulating grease 373 can also spread out into the space formed by step portions 374 between lower case 331 and assembling table 375.

Next, electric power storage unit 361 is removed from assembling table 375, as shown in FIG. 17C. Electric power storage unit 361 is lifted after the screws fixing the unit are removed. Heat-conductive insulating grease 373 adheres to both of lower case 331 and assembling table 375, and has an undulated surface, as shown in FIG. 17C.

Electric power storage unit 361 is then turned upside down. Then, an amount of heat-conductive insulating grease 373 corresponding to the height of step portions 374 is applied onto the bottom surface of lower case 331 and has the surface flattened simultaneously. FIG. 17D shows electric power storage unit 361. Heat-conductive insulating grease 373 is applied to the bottom surface of lower case 331 except for step portions 374 by moving squeegee 377 in the direction of an arrow. In this case, the heads of fixing screws 341 does not protrude from lower case 331 since fixing screws 341 have flat heads, similarly to the unit according to Embodiment 5. The flat heads facilitate applying heat-conductive insulating grease 373 smoothly on the entire bottom surface of lower case 331 (other than step portions 374) at once with squeegee 377, as shown in FIG. 17E. In this case, the second application of heat-conductive insulating grease 373 with squeegee 377 eliminates open pores (open bubbles) in the grease.

After the above processes, electric power storage unit 361 is turned again up and down, and is fixed onto base 371 with fixing screws, as shown in FIG. 17F, thus completing to fix electric power storage unit 361.

The above processes allow a uniform amount of heat-conductive insulating grease 373 to be applied without developing air bubbles in the space surrounded by the bottom surface of bottom portion 329, the wall surface of retaining hole 333, and base 371, the gap between retaining hole 333 and bottom portion 329, and also the gap between lower case 331 and bases 371, hence allowing heat of electric power storage elements 311 to transmit evenly and efficiently to base 371, as shown by the arrow in FIG. 17F.

The above structure provides the electric power storage unit with high reliability. Bottom portions 329 of electric power storage elements 311 are thermally coupled to base 371 via heat-conductive insulating grease 373 so as to dissipate the heat efficiently even though the structure does not allow art to circulate on the bottom surface of lower case 331. This structure holds electric power storage elements 311 having a variation in the heights thereof.

Fins may be provided on a surface opposite to of the surface of base 371 having electric power storage units 361 fixed thereon. Alternatively, a water passage may be provided in or on base 371 for circulating cooling water to dissipate the heat more.

In the manufacturing method according to Embodiment 6, electric power storage unit 361 is mounted to base 371 after unit 361 is assembled once on assembling table 375. Unit 361 may be assembled by fixing lower case 331 to base 371 from the beginning without using assembling table 375 so as to simplify the manufacturing process. However, this method disables to confirm whether heat-conductive insulating grease 373 is spread properly on lower surfaces of elastic portions 335 or not and to reapply heat-conductive insulating grease 373 even if the amount of the grease is insufficient or air bubbles exist in it since lower case 331 is not removed from assembling table 375 shown in FIG. 17C. This method also hinders workability of the assembling since base 371 having a large number of electric power storage units 361 mounted thereon has a large surface. Thus, assembling table 375 is preferably used to assemble units 361.

According to Embodiment 6, lower case 331 has step portions 374 formed unitarily. A spacer having a thickness of 0.2 mm may be inserted in the gap between lower case 331 and base 371 instead of providing step portions 374. The spacer is made of heat-conductive material, such as metal or carbon, having a heat-conductivity not smaller than that of lower case 331. The spacers can further facilitate heat dissipation from lower case 331 to base 371 although the number of components increases as compared with the structure provided with step portions 374.

Storage elements 311 according to Embodiments 5 and 6 have the cylindrical shape, but can have a prismatic shape. According to Embodiments 5 and 6, electric power storage element 311 is an electric double layer capacitor, and can be an electrochemical capacitor or a secondary battery.

Electric power storage unit 361 according to Embodiments 5 and 6 is adaptable not only to an auxiliary power supply for a motor vehicle, but also to an emergency power supply.

Exemplary Embodiment 7

An electric power storage unit according to Exemplary Embodiment 7 of the present invention will be described below. The electric power storage unit according to Embodiment 7 includes an elastic portion including a center portion connected with plural beams provided in the through-hole in the electric power storage according to Embodiment 4 for absorbing a variation of heights of electric power storage elements.

Figure 18:
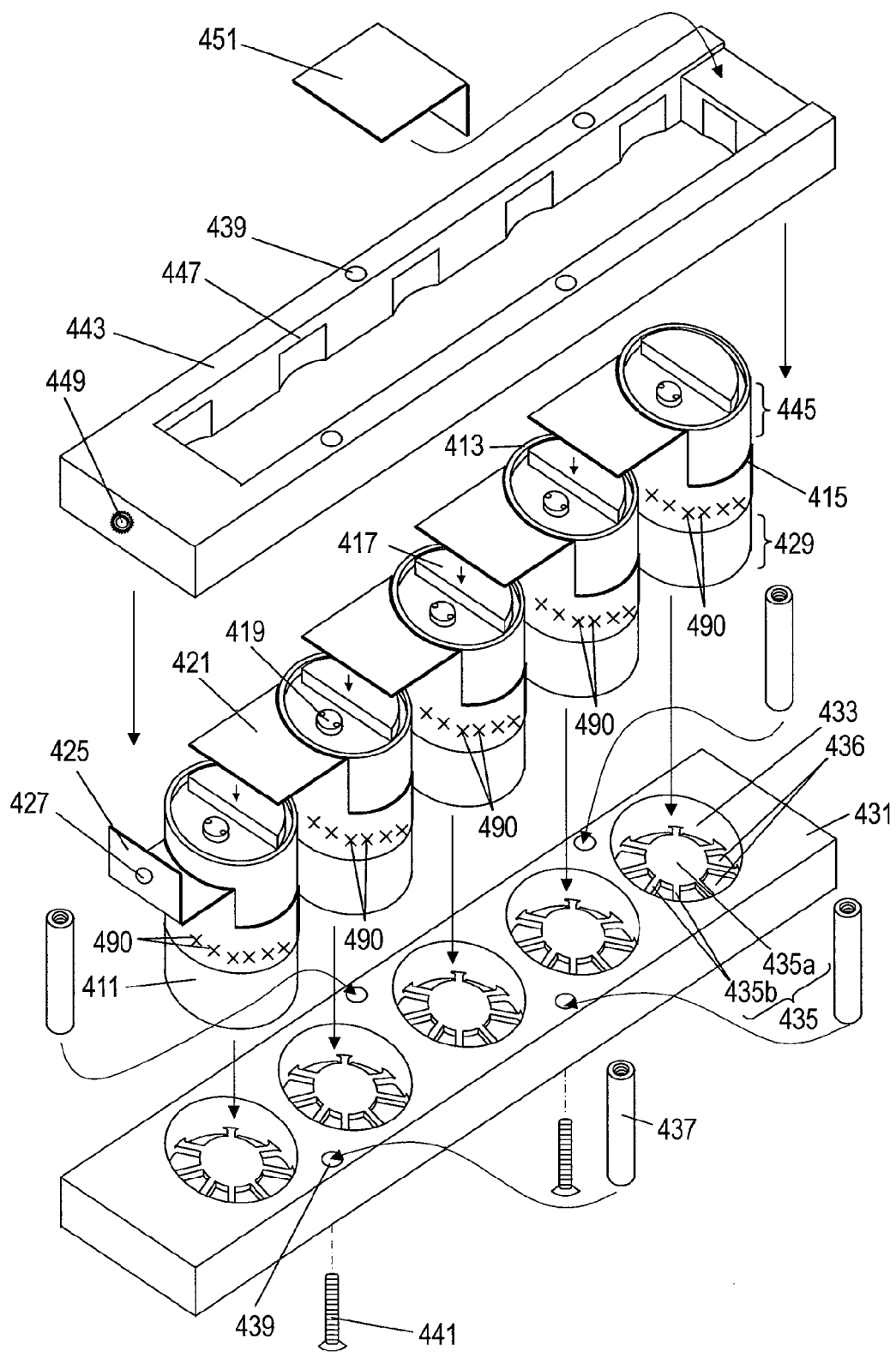
FIG. 18 is an exploded perspective view of an electric power storage unit according to Exemplary Embodiment 7 of the invention.
Figure 19:
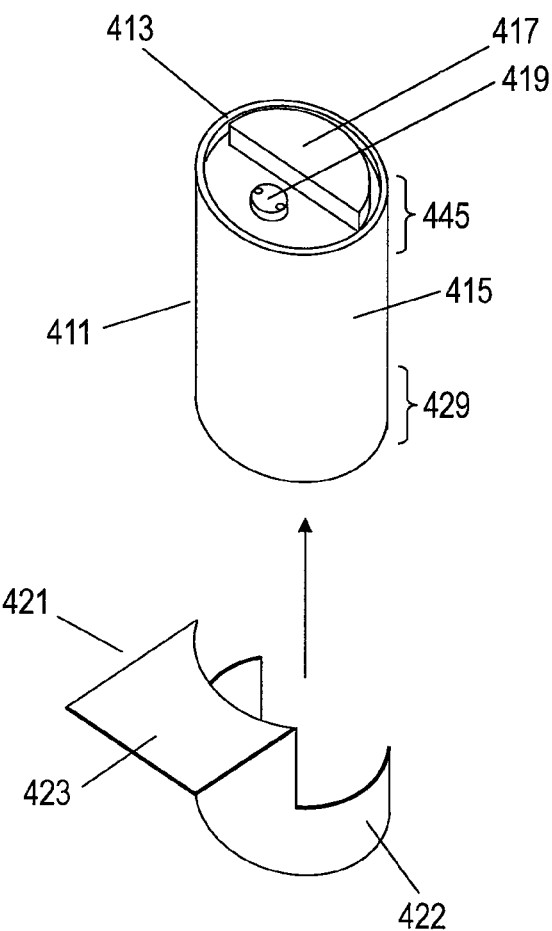
FIG. 19 is a perspective view of an electric power storage element and a bus bar of the electric power storage unit according to Embodiment 7.
Figure 20:
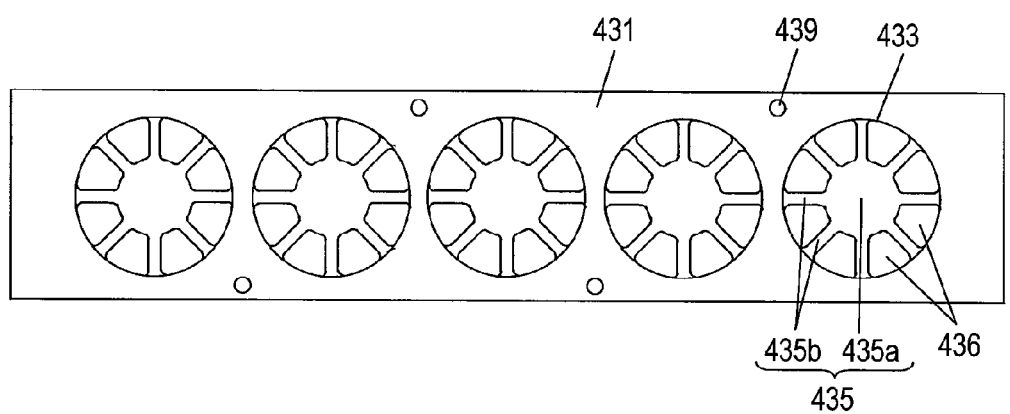
FIG. 20 is a plan view of a lower case of the electric power storage unit according to Embodiment 7.
Figure 21:
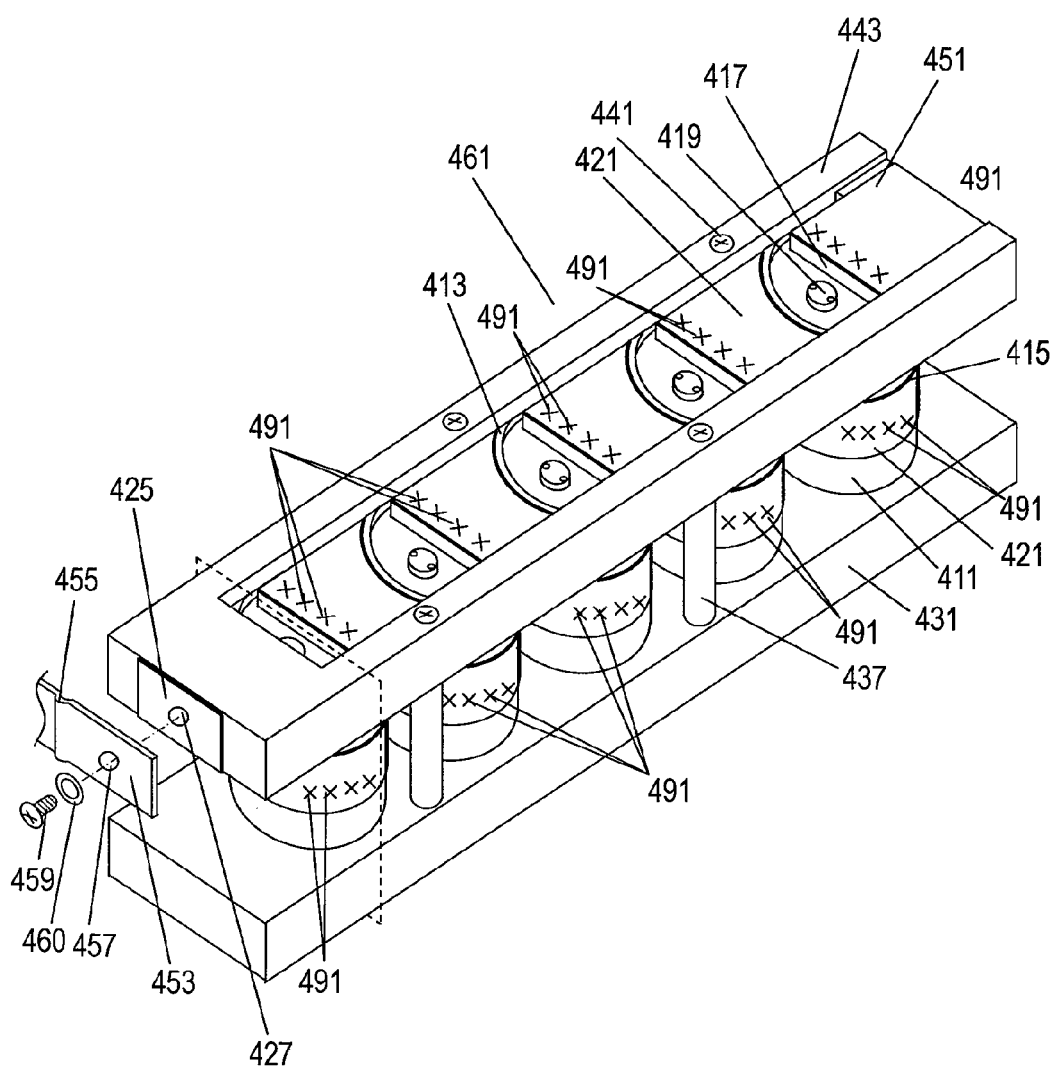
FIG. 21 is a perspective view of the electric power storage unit according to Embodiment 7.
Figure 22A:
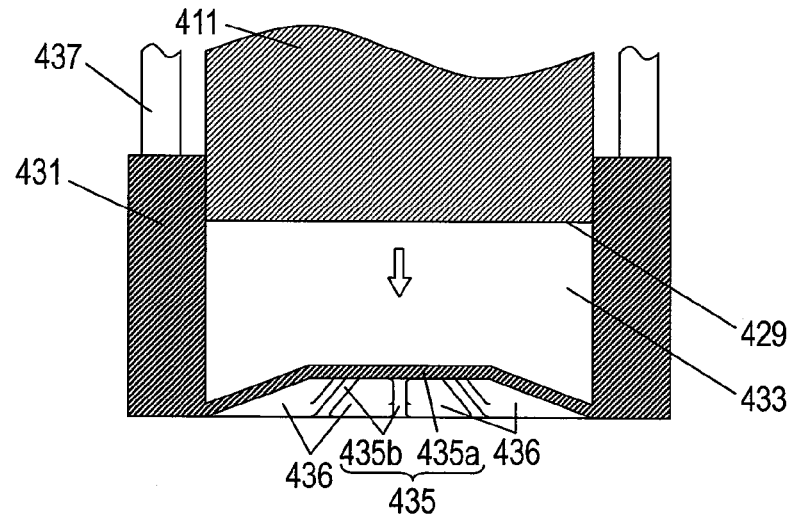
FIG. 22A is a cross sectional view of the electric power storage unit according to Embodiment 7.
Figure 22B:
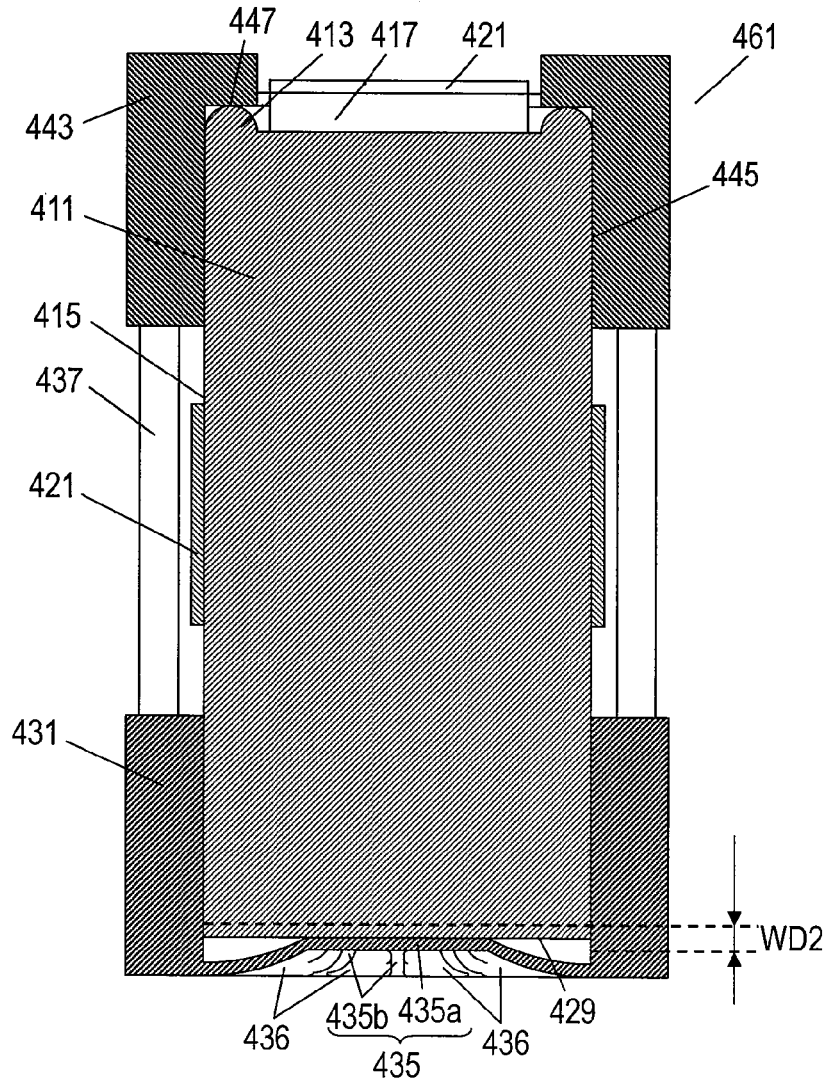
FIG. 22B is a cross sectional view of the electric power storage unit according to Embodiment 7.

FIG. 18 is an exploded perspective view of the electric power storage unit according to Embodiment 7. FIG. 19 is a perspective view of an electric power storage element and a bus bar of the electric power storage unit according to Embodiment 7. FIG. 20 is a plan view of a lower case of the electric power storage unit according to Embodiment 7. FIG. 21 is a perspective view of the electric power storage unit according to Embodiment 7. FIGS. 22A and 22B are cross sectional views of the electric power storage unit according to Embodiment 7. FIG. 22A is a sectional view of the electric power storage unit having the electric power storage element inserted in the lower case. FIG. 22B is a sectional view of the completed electric power storage unit.

In FIG. 18, electric power storage elements 411 for storing power are electric double layer capacitors having a circular column, cylindrical shape having a diameter of 3 cm, for instance. Electric power storage elements 411 are manufactured similarly to ordinary batteries having a cylindrical shape. Peripheral end rim 413 protruding by a process of caulking at an end surface (a top surface in FIG. 11) of electric power storage element 411. The cylindrical side surface of electric power storage element 411 is made of aluminum and connected internally to function as a negative electrode. The cylindrical side surface of electric power storage element 411 thus forms side electrode 415 entirely. The end surface function a cap which is made of aluminum. End electrode 417 is formed by pressing the end surface to have a semicircular shape. End electrode 417 has a height exceeding peripheral end rim 413. End electrode 417 is connected internally to function as a positive electrode. An insulator is placed securely between the cylindrical side surface and the cap of electric power storage element 411. Regulator valve 419 is provided on the cap and next to end electrode 417. Regulator valve 419 releases a pressure when an electrolyte filling an inside of electric power storage element 411 starts evaporating. The valve hence prevents an internal pressure in electric power storage element 411 from rising.

Bus bars 421 will be described below. Bus bars 421 electrically and mechanically connects plural electric power storage elements 411 arranged in a row with each other. Bus bars 421 are made of aluminum identical to material of side electrode 415 and end electrode 417. Aluminum is used for all these elements since side electrode 415 and end electrode 417 are connected by welding to internal electrodes of the electric double layer capacitor that are made of aluminum. They may be made of other metal as long as they all are made of the same metal. Bus bars 421 are also made of aluminum since bus bars 421 are connected to side electrode 415 and end electrode 417 by welding. The same metal facilitates the welding and provides an anticorrosive property since the metal does not create a local battery due to moisture.

Bus bar 421 has circumferential portion 422 fitted to the side surface of electric power storage element 411 and flat portion 423 welded to end electrode 417 of another electric power storage element 411 adjoining, as shown in FIG. 12. Portions 422 and 423 are unitarily formed by pressing an aluminum plate having a thickness of 0.5 mm. Bus bar 421 may have a flexible portion between a side (flat portion 423) connected to end electrode 417 and the other side (circumferential portion 422) connected to side electrode 415. The flexible portion absorbs a stresses exerted on bus bar 421 in the process of welding and while being subjected to vibrations inside a vehicle as well as deformation due to thermal expansions, thereby improving reliability. The flexible portion may be formed in flat portion 423 to easily form the bus bar.

Bus bar 421 is fitted to the side surface of electric power storage element 411 in the direction shown in FIG. 19, and connected by laser welding to electrically and mechanically contact side electrode 415 reliably. FIG. 18 shows laser-welding points 490. FIG. 18 shows multiple points of spot welding. The welding may be executed in a linear form by shifting the welding position continuously, thereby providing higher reliability of the connection than the spot welding. Thus, electric power storage element 411 is combined with bus bar 421.

Bus bar 421 is connected to electric power storage elements 411 other than one electric power storage element 411 having side electrode 415 having either the highest voltage or the lowest voltage among the side electrodes 415 of electric power storage elements 411. According to Embodiment 7, five electric power storage elements 411 are connected in series, as shown in FIG. 18, and the element which is shown at the nearest location in FIG. 18 has side electrode 415 having the lowest voltage since side electrodes 415 are negative electrodes and end electrodes 417 are positive electrodes. Bus bars 421 are connected to four electric power storage elements 411 other than the element shown at the nearest location. The electric power storage element 411 shown at the nearest location has side electrode 415 having the highest voltage if the internal connections of the electrodes are reversed in electric power storage elements 411. The structure of the electric power storage unit remains unchanged even in this case except that only the positive and negative polarities are reversed.

Negative bus bar 425 is connected to electric power storage element 411 shown at the nearest location, instead of bus bar 421. Negative bus bar 425 has a structure similar to that of bus bar 421 except that negative electrode 425 does not have the portion connected to end electrode 417 since no further electric power storage element is located next to it. Negative bus bar 425 has screw hole 427 arranged to be connected to a power line or an external bus bar, which is to be connected electrically with an external system outside of the electric power storage unit, as described later. Negative bus bar 425 is bent to have a shape fitting to an end of an upper case, as described later, to facilitate the connection to the power line or the external bus bar. This portion of bus bar 425 can have other shapes as appropriate according to a configuration of the electric power storage unit, routing of the power line and the like without being restricted by the structure shown in FIG. 18. Negative bus bar 425 connected to side electrode 415 of electric power storage element 411 shown at the nearest location by welding similarly to bus bars 421 connected to the other electric power storage elements 411.

Each of electric power storage elements 411 having either bus bar 421 or negative bus bar 425 connected thereto is then inserted in retaining hole 433 provided in lower case 431 while bottom portion 429 of element 411 is directed down into retaining hole 433. Retaining holes 433 have a diameter larger than an outer diameter of electric power storage elements 411 by, e.g. about 0.1 to 0.2 mm, hence allows electric power storage elements 411 to be inserted smoothly therein Lower case 431 is made of resin. Each of retaining holes 433 has elastic portion 435 formed unitarily in the bottom thereof. Elastic portion 435 includes center portion 435a provided at the center bottom of retaining holes 433 and plural beams 435b formed on a wall surface at the bottom of retaining holes 433. Beams 435b extend upwardly from the wall surface toward the center and are connected with the center portion 435a. Center portion 435a contacts bottom portion 429 of electric power storage element 411. According to Embodiment 8, eight beams 435b provide through-holes 436 between adjoining beams 435b. Such complex shape of elastic portion 435 is formed unitarily with lower case 431 by injection molding.

FIG. 20 shows the shape of elastic portion 435. FIG. 20 is a plan view of lower case 431 as seen from above. Elastic portion 435 includes center portion 435a which has a circular shape and which is provided at the center bottom of retaining hole 433 and beams 435b which are connected with center portion 435a and which extend radially in eight directions. Beams 435b arranged in a double-clamped structure increase their resistance to vibrations. Both ends of each beam 435b have rounded corners, as shown in FIG. 20, so as to prevent stresses from concentrating at both ends to each beam 435b, hence providing beams 435b with reliability. Center portion 435a has the circular shape, but may have any other shape, such as a polygonal shape (i.e., octagon in the example shown in FIG. 20) surrounded by straight sides between points where beams 435b are connected to center portion 435a.

Center portion 435a connected to beams 435b is located above the bottom of retaining hole 433 since beams 435b have the double-clamped structure extending upward from the wall surface of retaining hole 433 toward the center, as discussed above. Center portion 435a is depressed downward, as shown in FIG. 18, when bottom portion 429 of electric power storage element 411 contacts center portion 435a, a part of elastic portion 435. In this case, a distance by which center portion 435a is depressed, or a displaceable range of elastic portion 435 is larger than a variation of the heights of electric power storage elements 411 which is previously determined. This structure reliably holds electric power storage elements 411 having any variation in the heights since elastic portion 435 can deform to absorb the variation when electric power storage elements 311 is inserted in retaining holes 433.

An average width of beams 435b is smaller than an average width of through-holes 436. The average width of beams 435b is defined as a value obtained by averaging widths of beams 435b including the rounded corners. However, the average width of beams 435b is substantially equal to the width of beams 435b since the rounded corners can be ignored in the structure shown in FIG. 20. The average width of through-holes 436 is defined as a value obtained by averaging widths of through-holes 436 along the circumferential direction about center portion 435a. In the unit shown in FIG. 20, the average width of through-holes 436 can be approximated by averaging the smallest width (i.e., the width of through-holes 436 at the edge of center portion 435a) and the largest width (i.e., the width of through-holes 436 at the wall of retaining hole 433) since beams 435b have a parallel-sided shape. The average width of beams 435b is clearly smaller than the average width of through-holes 436, as shown in FIG. 20, in consideration with the definitions of the average widths. This structure effectively absorbs the variation in the heights of electric power storage elements 411 since beams 435b can warp sufficiently when electric power storage elements 411 are inserted in retaining holes 433.

When electric power storage elements 411 are inserted in retaining holes 433, the bottom surfaces of elements 411 are exposed from through-holes 436 provided in the bottoms of retaining holes 433. This structure dissipates heat from through-holes 436. Air circulating through-hole 436 dissipates the heat more.

An area of through-hole 436, which is defined as a projected area of through-hole as seen from above, as shown in FIG. 20, is preferably larger than a total area of elastic portions 435 in the bottom of retaining hole 433 in order to allow the end surface of bottom portion 429 to be exposed as much as possible. However, through-hole 436 having an excessively larger area provides the following problem.

In order to increase the area of through-holes 436, it is necessary to reduce either the area of center portion 435a, the width of beams 435b, or the number of beams 435b. There modification may fail to maintain a sufficient force for holding electric power storage element 411 when the area of center portion 435a is reduced since the length of beams 435b increases accordingly and allows beams 435b to warp easily. The force retaining electric power storage element 411 become insufficient if either of the width or the number of beams 435b is reduced excessively.

The area of through-hole 436 is preferably as large as possible within a range appropriate to ensure the displaceable range and the retaining force necessary for elastic portion 435 to hold electric power storage element 411. In addition, the number of beams 435b is eight according to Embodiment 7, but may be determined to make the area of through-hole 436 as large as possible under the above conditions. The design of these structures change depending on conditions, such as the size and weight of electric power storage element 411, vibrations applied within a vehicle and a required characteristic of heat dissipation, and these conditions shall therefore be taken into consideration as appropriate in the designing.

The structure shown in FIG. 18 will be described below. Fixing rods 437 are previously secured to lower case 431 in order to fix lower case 431 securely to the upper case, which will be described later. The unit according to Embodiment 5 includes four fixing rods 437. Fixing rods 437 has a threaded screw at each end thereof. Lower case 431 has screw holes 439 formed therein. Fixing rods 437 are positioned at screw holes 439 and fixed to lower case 431 by tightening fixing screws 441. Fixing screws 441 have flat heads so that the screw heads do not protrude from lower case 431.

Next, electric power storage elements 411 are inserted in retaining holes 433 in lower case 431 in the order from the element shown at the nearest location in FIG. 18 to the element shown at the farthest location in FIG. 18. Flat portion 423 of bus bar 421 is placed on an upper surface of end electrode 417 of adjoining electric power storage element 411 when they are inserted one after another. Flat portion 423 of bus bar 421 attached to one electric power storage element 411 contacts end electrode 417 of the adjacent electric power storage element 411. Bus bar 421 is not placed on end electrode 417 of electric power storage element 411 shown at the furthest location in FIG. 18 since no electric power storage element is located next to it. End electrode 417 of this element is connected with a positive bus bar described later.

After electric power storage elements 411 is inserted in lower case 431, top portions 445 of electric power storage elements 411 are inserted in upper case 443. Upper case 443 has a rectangular frame shape as seen from above so that bus bars 421 and regulator valves 419 are exposed. Upper case 443 has contact portions 447 contacting respective parts of peripheral end rims 413 of electric power storage elements 411. Contact portions 447 are formed unitarily with the upper case, and function as reference points for fixing electric power storage elements 411. According to Embodiment 7, contact portions 447 contact respective parts of peripheral end rims 413, but may contact peripheral end rims entirely. Upper case 443 has screw holes 439 similar to the screw holes of lower case 431 for mechanically connecting to fixing rods 437. Upper case 443 has insert nut 449 embedded in a position corresponding to screw hole 427 of negative bus bar 425. End electrode 417 of electric power storage element 411 shown at the furthest location in FIG. 18 has the highest voltage, and has positive bus bar 451 for external connection mounted thereon. Upper case 443 has another insert nut embedded in a position corresponding to a screw hole provided in positive bus bar 451 similarly to screw hole 427 of negative bus bar 425. All of the above structural elements are unitarily formed by injection molding since upper case 443 is made of resin identical to material of lower case 431.

When top portions 445 of electric power storage elements 411 are inserted into upper case 443, parts of peripheral end rims 413 of electric power storage elements 411 contact contact portions 447. However, since center portions 435a of elastic portions 435 exert forces on electric power storage elements 411 to move upward in the upward direction of FIG. 18, and produces gaps between upper case 443 and fixing rods 437 Fixing screws 441 are then tightened while keeping upper case 443 depressed to close the gaps, thereby fixing upper case 443 to lower case 431.

FIG. 21 shows the electric power storage unit manufactured up to the above processes. Each of bus bars 421 is placed on end electrode 417 of the next electric power storage element 411, and is connected electrically and mechanically to end electrode 417 by laser welding. Bus bars 421 does not contact peripheral end rims 413 to be prevented from short-circuiting since end electrodes 417 protrude above peripheral end rims 413. FIG. 21 shows laser-welding points 491. The laser welding may be executed at multiple points by spot welding or continuously in a linear form as illustrated in the process of laser welding to side electrodes 415.

At this moment, positive bus bar 451 is placed on end electrode 417 of electric power storage element 411 shown at the furthest location in FIG. 21, and are connected by laser welding similarly to other bus bars 421. This allows connection of external wiring to positive bus bar 451. A bent portion of negative bus bar 425 is fixed to upper case 443, as shown in FIG. 21, thereby being connected to an external wiring. According to Embodiment 7, external bus bar 453 is connected as the external wiring. External bus bar 453 is made of copper and has a thickness of 1 mm. External bus bar 453 has flexible portion 455 formed unitarily as a part thereof. Flexible portion 455 absorbs stresses exerted on external bus bar 453 due to vibrations or thermal expansions while external bus bar 453 is fixed to bus bar 425. External bus bar 453 has screw hole 457 for fixing external bus bar 453 with a screw. That is, external bus bar 453 is connected to negative bus bar 425 with positioning screw hole 457 of external bus bar 453 which is positioned on screw hole 427 of negative bus bar 425 and screw 459 tightened into insert nut 449 through washer 460. Positive bus bar 451 is connected by the same method.

Another end of external bus bar 453 is connected to another electric power storage unit 461, which is not illustrated in FIG. 21. Thus, a large number of electric power storage units 461 can be connected in this manner.

Spaces are provided between electric power storage elements 411 adjacent to each other while elements 411 are inserted in upper case 443 and lower case 431. The length of flat portions 423 of bus bars 421 increases according to the width of the spaces, and allows bus bars 421 to deform easily. This structure reduces the influence of pressing forces exerted on electric power storage elements 411 by bus bars 421 of the adjoining electric power storage elements 411 since bus bars 421 can deform easily when electric power storage elements 411 are depressed by contact portions 447, thereby allowing electric power storage elements 411 to be fixed independently. Each bus bar 421 may preferably have provide a flexible portion absorbing the influence of the pressing forces produced by bus bars 421 of the adjoining electric power storage elements 411.

FIGS. 22A and 22B are cross sectional views of the electric power storage unit in plane 22B shown in FIG. 21. The cross sectional view of FIG. 22A illustrates a part of the electric power storage unit in which bottom portion 429 of electric power storage element 411 is inserted in the direction of an arrow into retaining hole 433 in lower case 431 having fixing rods 437 previously mounted. The cross sectional view of FIG. 22B illustrates completed electric power storage unit 461. Note that the clearance between electric power storage element 411 and retaining hole 433 provided by a difference in their diameters is not shown in FIG. 22A or 22B.

As shown in FIG. 22A, plural beams 435b of elastic portion 435 extending upward and toward the center from the wall surface of retaining hole 433 raise center portion 435a. After electric power storage element 411 is inserted in retaining hole 433, upper case 443 is placed on top portion 445 of electric power storage element 411, and then fixing screws 441 are tightened to fix upper case 443 to fixing rods 437 while the end surface of bottom portion 429 contacts center portion 435a of elastic portion 435. This makes contact portions 447 depress parts of peripheral end rim 413 of electric power storage element 411 downward as shown in FIG. 22B. Fixing screws 441 are not shown in FIG. 22B since screws 441 have flat heads. Bottom portion 429 of electric power storage element 411 depresses center portion 435a and deforms beams 435b to hold electric power storage element 411 securely. Each elastic portion 435 has displaceable range WD2, a distance by which center portion 435a is depressed downward. Displaceable range WD2 is larger than the variation of the heights of electric power storage elements 411 shown by arrows in FIG. 22B. The displacement of elastic portion 435 absorbs the variation of the heights of elements 411 with respect to contact portions 447. This structure reliably holds all electric power storage elements 411 and reduces stresses applied to the weld-connected portions and bus bars 421 due to vibrations of the vehicle. In addition, the heat generated by electric power storage elements 411 is dissipated via through-holes 436 provided between adjoining beams 435b when electric power storage unit 461 allows air to circulate through the bottom surface of lower case 431. The structure thus provides preferable heat dissipation and high reliability.

Thus, through-hole 436 which dissipates the heat of electric power storage elements 411 and elastic portions 435 which absorb the variation of the heights of bus bars 421 reduce fatigue due to stress the heat of electric power storage elements 411 and the deformation of bus bar 421, thus providing the electric power storage unit with high reliability.

According to Embodiment 7, screw 459 is tightened into insert nut 449. Upper case 443 may have a recess having inner dimensions for fitting the nut in the location corresponding to screw hole 427 to have the recess accommodate the nut therein. In this case, screw 459 can be tightened without causing the nut to turn together since angled edges of the nut contact the inner walls of the recess. This structure can be employed at the side where positive bus bar 451 is connected.

Exemplary Embodiment 8

Figure 23A:
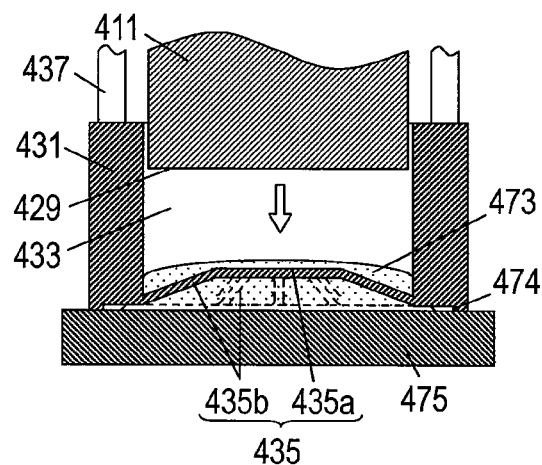
FIG. 23A is a cross sectional view of an electric power storage unit for illustrating a method of manufacturing the electric power storage unit according to Exemplary Embodiment 8 of the invention.
Figure 23B:
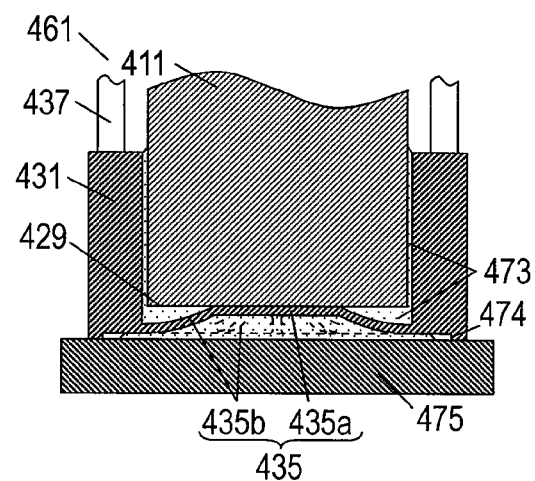
FIG. 23B is a cross sectional view of the electric power storage unit for illustrating the method of manufacturing the electric power storage unit according to Embodiment 8.
Figure 23C:
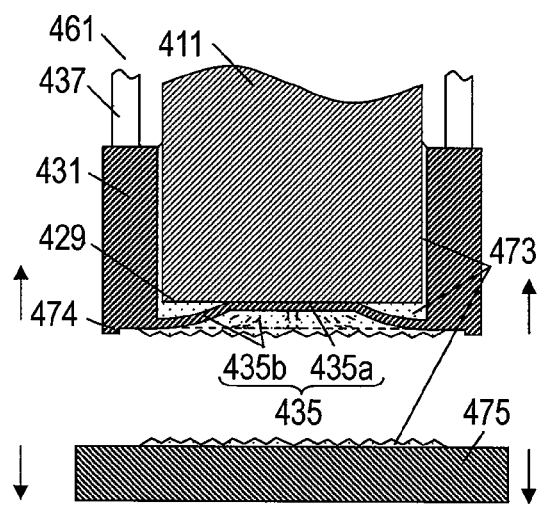
FIG. 23C is a cross sectional view of the electric power storage unit for illustrating the method of manufacturing the electric power storage unit according to Embodiment 8.
Figure 23D:
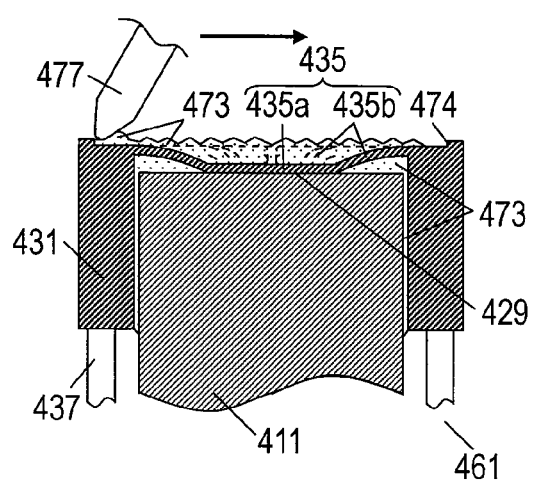
FIG. 23D is a cross sectional view of the electric power storage unit for illustrating the method of manufacturing the electric power storage unit according to Embodiment 8.
Figure 23E:
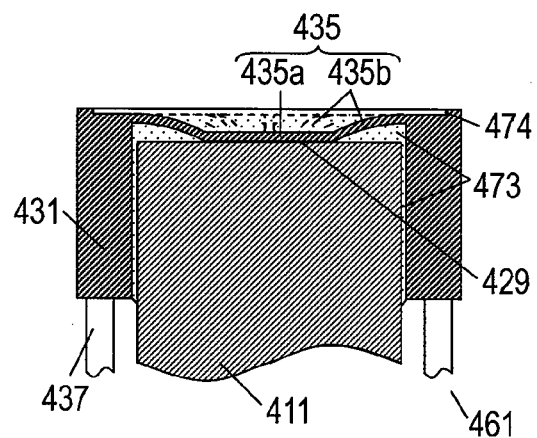
FIG. 23E is a cross sectional view of the electric power storage unit for illustrating the method of manufacturing the electric power storage unit according to Embodiment 8.
Figure 23F:
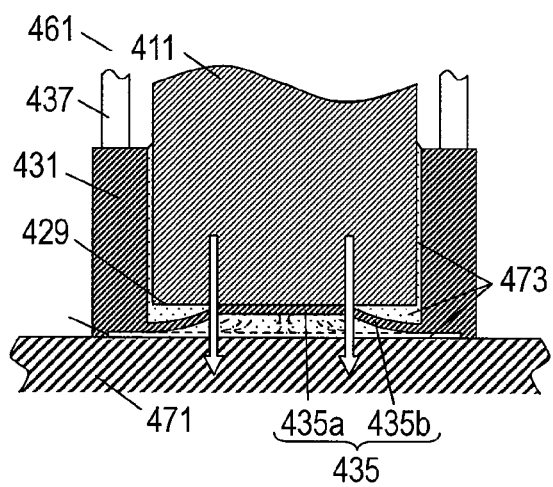
FIG. 23F is a cross sectional view of the electric power storage unit for illustrating the method of manufacturing the electric power storage unit according to Embodiment 8.
Figure 24:
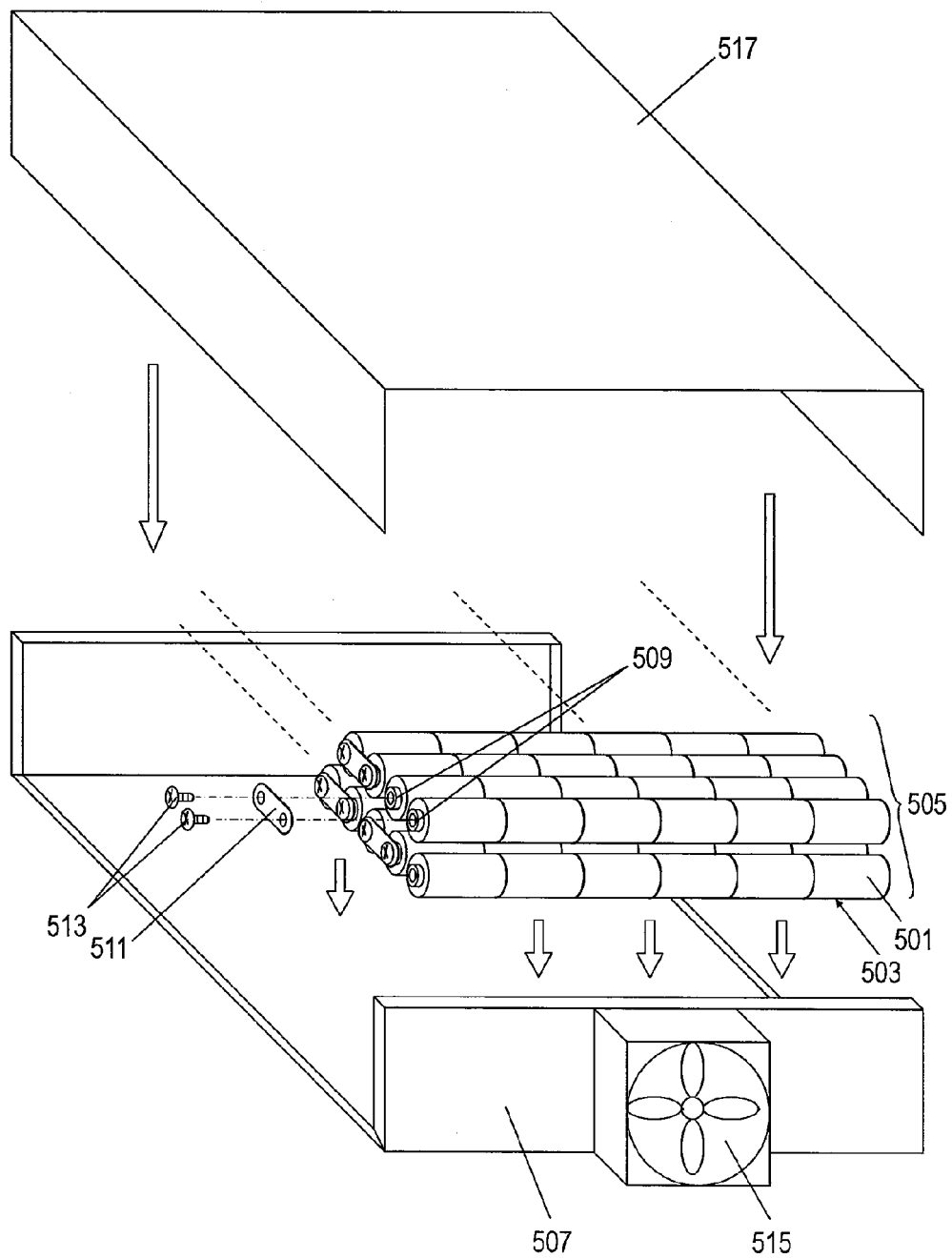
FIG. 24 is an exploded perspective view of a conventional electric power storage unit.

FIGS. 23A to 23F are cross sectional views of an electric power storage unit according to Exemplary Embodiment 8 of the present invention for illustrating a method of manufacturing the unit. FIG. 23A is a cross sectional view of the electric power storage unit having an electric power storage element inserted into a lower case. FIG. 23B is a cross sectional view of the electric power storage element which in completed. FIG. 23C is a cross sectional view of the unit having the electric power storage unit removed from an assembling table. FIG. 23D is a cross sectional view of the unit having heat-conductive insulating grease applied to a bottom surface of the lower case. FIG. 23E is a cross sectional view of the unit having the heat-conductive insulating grease is completed to apply onto the bottom surface of the lower case. FIG. 23F is a cross sectional view of the unit mounted on a base. In FIGS. 23A to 23F, a clearance between electric power storage element 411 and retaining hole 433 created by a difference of their diameters is illustrated larger than an actual size for easy explanation.

According to Embodiment 8, components identical to those of Embodiment 7 are denoted by the same reference numerals, and their detail description will be omitted. The unit according to Embodiment 8 provides heat dissipation even if an electric power storage apparatus includes plural electric power storage units 461 arranged such that air does not circulate under the bottom surface of lower case 431. The unit according to Embodiment 8 has the following features in addition to the features of the unit according to Embodiment 7:

(1) Plural electric power storage units 461 are arranged such that lower case 431 of each unit 461 is fixed to base 471 made of metal;

(2) Heat-conductive insulating grease 473 is applied between bottom portions 429 of electric power storage elements 411 and base 471 and between lower cases 431 and base 471; and (3) Lower case 431 has step portions 474 at portions of case 431 facing base 471.

According to Embodiment 8, base 471 is made of aluminum having high heat conductivity and a small weight. Heat-conductive insulating grease 473 is made of, for example, silicone resin mixed with filler made of ceramic (e.g., alumina). Step portions 474 are formed as unitary portions of lower case 431 with a height of about 0.2 mm to cause heat to transmit well from lower case 431 to base 471. Step portions 474 allow heat-conductive insulating grease 473 provided between lower case 431 and base 471 to have a thickness equal to the height of step portions 473 (0.2 mm). This structure provides uniform thicknesses of heat-conductive insulating grease 473 between lower cases 431 and base 471 for electric power storage units 461 placed on base 471, thereby reducing unevenness of the heat dissipation among electric power storage units 461.

A method of manufacturing the unit will be described below with reference to FIGS. 23A to 23F.

First, lower case 431 having fixing rods 437 previously attached is mounted onto assembling table 475, as shown in FIG. 23A. The lower case is fixed by tightening screws into assembling table 475 through screw holes provided in mounting portions formed unitarily with lower case 431.

Next, heat-conductive insulating grease 473 is injected on the bottom of retaining hole 433. The amount of heat-conductive insulating grease 473 to be injected is previously determined to sufficiently fill a gap provided between bottom portion 429 and base 471 after electric power storage unit 461 is mounted on base 471. According to Embodiment 8, elastic portions 435 are buried in heat-conductive insulating grease 473 after the predetermined amount of heat-conductive insulating grease 473 is injected, as shown by the dotted line in FIG. 23A. Through-hole 436 is thus filled with heat-conductive insulating grease 473. A dispenser is used for injecting the predetermined amount of heat-conductive insulating grease 473.

Next, bottom portion 429 of electric power storage element 411 is inserted into retaining hole 433 in the direction of an arrow. Upper case 443 is fixed to fixing rods 437 similarly to the unit according to Embodiment 7. Bus bars 421 are welded to be connected, thereby completing electric power storage unit 461. FIG. 23B shows a cross sectional view of lower case 431 and the vicinity. Bottom portion 429 inserted into retaining hole 433 causes the bottom surface of bottom portion 429 to contact and depress center portion 435a of elastic portion 435. This structure absorbs the variation of the heights of electric power storage elements 411 to reliably hold the unit, similarly to the unit according to Embodiment 7.

The gap surrounded by the bottom surface of bottom portion 429, the wall surface of retaining hole 433, and assembling table 475 is filled with heat-conductive insulating grease 473. Bottom portion 429 inserted into retaining hole 433 causes heat-conductive insulating grease 473 to rise through the gap (i.e., clearance) between them so as to fill the gap. As a result, all the gap and the clearance between bottom portion 429 and retaining hole 433 are completely filled with heat-conductive insulating grease 473. Since electric power storage element 411 is inserted into retaining hole 433 while compressing heat-conductive insulating grease 473 with bottom portion 429, heat-conductive insulating grease 473 is spread without producing air bubbles that affects the heat dissipation. Heat-conductive insulating grease 473 is spread into the space formed by step portions 474 between lower case 431 and assembling table 475

Next, electric power storage unit 461 is removed from assembling table 475, as shown in FIG. 23C. Electric power storage unit 461 is lifted after the screws holding them together are removed. Heat-conductive insulating grease 473 adheres to both of lower case 431 and assembling table 475, thus having an undulated surface, as shown in FIG. 23C.

The removed electric power storage unit 461 is then turned upside down. Then, an additional amount of heat-conductive insulating grease 473 corresponding to the height of step portions 474 is applied on the bottom surface of lower case 431, and has the undulated surface flattened simultaneously. FIG. 23D shows electric power storage unit 461. Heat-conductive insulating grease 473 is applied to the bottom surface of lower case 431 except for step portions 474 by moving squeegee 477 in the direction of an arrow. In this case, the heads of fixing screws 441 do not project from the lower case 431 since fixing screws 441 have the flat heads, similarly to Embodiment 7. The flat heads facilitate applying heat-conductive insulating grease 473 smoothly on the entire bottom surface of lower case 431 (other than step portions 474) at once with squeegee 477, as shown in FIG. 17E. In this case, the second application of heat-conductive insulating grease 473 with squeegee 477 eliminates open pores (open bubbles) in the grease.

After the above processes, electric power storage unit 461 is turned again upside down, and is fixed to base 471 with fixing screws, as shown in FIG. 23F to fix electric power storage unit 461.

The above processes allow a uniform amount of heat-conductive insulating grease 473 to be applied without developing air bubbles in the space surrounded by the bottom surface of bottom portion 429, the wall surface of retaining hole 433, and base 471, the gap between retaining hole 433 and bottom portion 429, and also the gap between lower case 431 and bases 471, hence allowing heat of electric power storage elements 411 to transmit evenly and efficiently to base 471, as shown by the arrow in FIG. 23F.

The above structure provides the electric power storage unit with high reliability. Bottom portions 429 of electric power storage elements 411 are thermally coupled to base 471 via heat-conductive insulating grease 473 so as to dissipate the heat efficiently even though the structure does not allow art to circulate on the bottom surface of lower case 431. This structure holds electric power storage elements 411 having a variation in the heights thereof.

Fins may be provided on a surface opposite to of the surface of base 471 having electric power storage units 461 fixed thereon. Alternatively, a water passage may be provided in or on base 471 for circulating cooling water to dissipate the heat more.

In the manufacturing method according to Embodiment 8, electric power storage unit 461 is mounted to base 471 after unit 461 is assembled once on assembling table 475. Unit 461 may be assembled by fixing lower case 431 to base 471 from the beginning without using assembling table 475 so as to simplify the manufacturing process. However, this method disables to confirm whether heat-conductive insulating grease 473 is spread properly on lower surfaces of elastic portions 435 particularly center portion 435*a* or not and to reapply heat-conductive insulating grease 473 even if the amount of the grease is insufficient or air bubbles exist in it since lower case 431 is not removed from assembling table 475 shown in FIG. 23C. This method also hinders workability of the assembling since base 471 having a large number of electric power storage units 461 mounted thereon has a large surface. Thus, assembling table 475 is preferably used to assemble units 461.

According to Embodiment 8, lower case 431 has step portions 474 formed unitarily. A spacer having a thickness of 0.2 mm may be inserted in the gap between lower case 431 and base 471 instead of providing step portions 474. The spacer is made of heat-conductive material, such as metal or carbon, having a heat-conductivity not smaller than that of lower case 431. The spacers can further facilitate heat dissipation from lower case 431 to base 471 although the number of components increases as compared with the structure provided with step portions 474.

Storage elements 411 according to Embodiments 7 and 8 have the cylindrical shape, but can have a prismatic shape. According to Embodiments 7 and 8, electric power storage element 411 is an electric double layer capacitor, and can be an electrochemical capacitor or a secondary battery.

Electric power storage unit 461 according to Embodiments 7 and 8 is adaptable not only to an auxiliary power supply for a motor vehicle, but also to an emergency power supply.

INDUSTRIAL APPLICABILITY

An electric power storage unit according to the present invention has high reliability and reduces unevenness of cooling electric power storage elements, and is useful as an electric power storage apparatus especially for such use as an auxiliary power supply and an emergency power supply adaptable to motor vehicles.

The invention claimed is:

1. An electric power storage unit comprising:
a plurality of electric power storage elements;
a holder including retaining sections, each of the retaining sections holding a respective one of the plurality of electric power storage elements by having a respective one of bottom portions of the plurality of electric power storage elements inserted therein; and
a base made of metal for fixing the holder
wherein the holder has a first surface and a second surface opposite to the first surface, the first surface faces the plurality of electric power storage elements, and the second surface faces the base,
wherein the holder has therein a plurality of through-holes passing from the first surface to the second surface at the retaining sections, respectively, and wherein a plurality of heat-conductive insulating greases are provided in the through-holes, and each of the heat-conductive insulating greases contact the base and each respective one of the bottom portions of the plurality of electric power storage elements,
wherein each of the plurality of through-holes has a first opening and a second opening, the first opening opens to the first surface of the holder, and the second opening opens to the second surface of the holder and is larger than the first opening,
wherein the second opening of each of the plurality of through-holes is between the base and the first opening of a respective one of the plurality of through-holes, and
wherein the first opening of each of the plurality of through-holes is between a respective one of the plurality of electric power storage elements and the second opening of a respective one of the plurality of through-holes.

2. The electric power storage unit according to claim 1,
wherein the retaining sections comprise a plurality of retaining holes provided in the holder, each of the bottom portions of the plurality of electric power storage elements inserted in a respective one of the plurality of retaining holes, the plurality of retaining holes having bottoms facing the bottom portions of the plurality of electric power storage elements, respectively,
wherein the holder has an elastic portion extending from an inner wall surface of each of the plurality of retaining holes at each of the bottoms of the plurality of retaining holes, and the elastic portion has each respective one of the through-holes provided therein,
wherein each of the bottom portions of the plurality of electric power storage elements contacts the elastic portion of each respective one of the plurality of retaining holes,
wherein each of the bottoms of the retaining holes has a further through-hole therein connected to each respective one of the through-holes, and
wherein each of the plurality of heat-conductive insulating greases contacts the base and each respective one of the bottom portions of the plurality of electric power storage elements through each further through-hole and each respective one of the through-holes.

3. The electric power storage unit according to claim 2,
wherein the elastic portion comprises a plurality of elastic portions having a cantilever structure extending upward and toward a center of each of the retaining holes from the wall surface at a respective one of the bottoms of the retaining holes, wherein the further through-hole is provided between a pair of elastic portions out of the plurality of elastic portions which are adjacent to each other, wherein each of the plurality of heat-conductive insulating greases contacts the base and each respective one of the bottom portions of the plurality of electric power storage elements through the further through-hole and each respective one of the through-holes.

4. The electric power storage unit according to claim 3, wherein the holder includes:

a lower case facing the base and having the retaining holes and the through-holes therein; and an upper case having top portions of the plurality of electric power storage elements inserted therein for supporting the plurality of electric power storage elements between the lower case and the upper case, wherein displaceable ranges of the plurality of elastic portions are larger than a difference of heights from the bottom portions to the top portions of the plurality of electric power storage elements.

5. The electric power storage unit according to claim 1, wherein the holder has a step portion provided at a portion of the holder facing the base such that the second opening of each of the through-holes is larger than the first opening of respective one of the plurality of through-holes.

6. The electric power storage unit according to claim 1, wherein a spacer is provided between the holder and the base such that the second opening of each of the through-holes is larger than the first opening of respective one of the plurality of through-holes.

7. The electric power storage unit according to claim 6, wherein the spacer is made of material having a heat-conductivity not smaller than a heat-conductivity of the holder.

8. The electric power storage unit according to claim 1, wherein each of the through-holes has a cross section flaring toward the base from respective one of the bottom portions of electric power storage elements such that the second opening of each of the through-holes is larger than the first opening of respective one of the plurality of through-holes.

9. The electric power storage unit according to claim 1, wherein the second surface of the holder entirely surrounds the second opening of each of the plurality of through-holes.

* * * * *